(12) United States Patent
Azuma et al.

(10) Patent No.: US 6,477,132 B1
(45) Date of Patent: Nov. 5, 2002

(54) PROBE AND INFORMATION RECORDING/REPRODUCTION APPARATUS USING THE SAME

(75) Inventors: Hiroo Azuma, Zama; Kiyoshi Takimoto; Takehiko Kawasaki, both of Atsugi; Yasuhiro Shimada, Hadano; Takeo Yamazaki, Yokohama, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/373,227

(22) Filed: Aug. 12, 1999

(30) Foreign Application Priority Data

Aug. 19, 1998 (JP) .............................. 10-249101
Mar. 12, 1999 (JP) .......................... 11-066830

(51) Int. Cl.⁷ ................................. G11B 7/00
(52) U.S. Cl. ................ 369/126; 369/47.1; 250/306
(58) Field of Search ................ 369/126, 47.1, 369/53.1, 100, 124.01; 250/306, 307

(56) References Cited

U.S. PATENT DOCUMENTS

| | | | |
|---|---|---|---|
| 5,323,377 A | | 6/1994 | Chen et al. |
| 5,373,494 A | * | 12/1994 | Kawagishi et al. ......... 369/126 |
| 5,398,229 A | | 3/1995 | Nakayama et al. |
| 5,481,527 A | | 1/1996 | Kasanuki et al. |
| 5,546,375 A | * | 8/1996 | Shimada et al. ............ 369/126 |
| 5,777,977 A | | 7/1998 | Fujiwara et al. |

FOREIGN PATENT DOCUMENTS

| | | |
|---|---|---|
| EP | 0 449 409 | 10/1991 |
| JP | 63-161552 | 7/1988 |
| JP | 63-161553 | 7/1988 |

OTHER PUBLICATIONS

K. Lee, et al., "Submicron Si Trench Profiling With An Electron–Beam Fabricated Atomic Force Microscope Tip", Journal of Vacuum Science and Technology B, Second Series, vol. 9, No. 6, pp. 3562–3568 (Nov./Dec. 1991).

T.R. Albrecht, et al., "Nanometer–Scale Hole Formation On Graphite Using A Scanning Tunneling Microscope", Applied Physics Letters, vol. 55, No. 17, pp. 1727–1729 (Oct. 23, 1989).

"Switching and Memory Phenomena in Langmuir–Blodgett Film with Scanning Probe Microscope", Takimoto, et al., Canon Research Center, Canon Inc., 63 Oyo Buturi 470–477 (1994).

* cited by examiner

Primary Examiner—Muhammad Edun
(74) Attorney, Agent, or Firm—Fitzpatrick, Cella, Harper & Scinto

(57) ABSTRACT

Probe including a cantilever having a movable end and formed from an elastic body, an electroconductive sensing needle arranged at the movable end of the cantilever, and a field effect transistor arranged at the movable end of the cantilever and having a gate electrode electronically connected to the electroconductive sensing needle. The probe may further comprise another field effect transistor formed on the cantilever and having its drain electrically connected to the sensing needle. The probe may be used in an information recording/reproduction apparatus.

13 Claims, 18 Drawing Sheets

PROBE AND INFORMATION RECORDING/REPRODUCTION APPARATUS USING THE SAME

BACKGROUND OF THE INVENTION

1. Field of the Invention

This invention relates to a probe to be used for high density information recording/reproduction by applying the principle of the scanning probe microscope (SPM). It also relates to an information recording/reproduction apparatus comprising such a probe.

2. Related Background Art

The scanning tunnelling microscope (STM) and the atomic force microscope (AFM) are two typical types of microscopes that can be used to observe the surface condition of a specimen with a level of resolution useful for seeing atoms.

The operation of STM is based on the following principle. As a sensing needle electrode that is a metal needle is brought close to the surface of an electroconductive specimen to make them separated from each other by a distance less than tens of angstroms and a voltage is applied between the sensing needle electrode and the specimen, a tunnelling current flows therebetween. The tunnelling current sensitively reacts to the distance between the sensing needle electrode and the surface of the specimen. In the STM, a feedback control mechanism is activated to regulate the distance between the sensing needle electrode and the surface of the specimen in order to maintain the tunnelling current to a constant level, while the sensing needle is driven to two-dimensionally scan the surface of the specimen. The locus of the tip of the sensing needle can be imaged by mapping the feedback control signal in synchronism with the two-dimensional scanning operation while maintaining the tunnelling current at the constant level. If the physical properties of the specimen are invariable on the entire surface thereof, the imaged locus can be regarded as reflection of the surface profile of the specimen. A piezoelectric element is normally used to regulate the distance between the sensing needle electrode and the surface of the specimen and the scanning operation of the sensing needle electrode.

On the otherhand, the operation of an AFM is based on the following principle. As a sensing needle having a sharp tip is brought very close to the surface of a specimen, the tip of the sensing needle is subjected to the force of atoms on the surface of the specimen. If the sensing needle is supported by an elastic body, the atomic force that the tip of the sensing needle receives from the surface of the specimen can be expressed in terms of the displacement of the elastic body. In the AFM, a feedback control mechanism is activated to regulate the distance between the sensing needle and the surface of the specimen in order to maintain the displacement at a constant level, while the sensing needle is driven to two-dimensionally scan the surface of the specimen. The surface profile of the specimen can be imaged by mapping the feedback control signal in synchronism with the two-dimensional scanning operation. A cantilever is normally used for the elastic body. A cantilever is usually displaced only to a very small extent and the displacement is detected by shooting the cantilever from the back by means of a laser beam and detecting the displacement by way of the angle of deflection of the reflected beam or by arranging an STM behind the cantilever and detecting changes in the tunnelling current of the STM. In the case of the AFM, a contact mode of operation of driving the sensing needle that is held in contact with the surface of the specimen by a small force is feasible so that the surface profile of the specimen can be imaged directly from the displacement of the elastic body (the deflection of the cantilever). In other words, in a contact mode of operation, the distance between the sensing needle and the surface of the specimen is constantly nil and hence does not require the use of a feedback control mechanism so that the surface can be observed by means of a high speed scanning operation. If an electroconductive sensing needle electrode is used for the sensing needle of the AFM, it is possible to observe the distribution of electric conductivity on the surface of the specimen while observing the surface profile.

Both the STM and the AFM are characterized in that they can be used to directly observe the surface of a specimen by utilizing the interaction of the tip of the sensing needle and the surface of the specimen that are held very close to each other. Various microscopes have been developed on the basis of the interaction other than that of tunnelling current or force. Such microscopes are generically referred to as scanning probe microscopes.

In recent years, information recording/reproduction apparatuses have been developed by utilizing the SPM in order to write information on a minute area of the surface of an object and read the information therefrom. For example, T. R. Albrecht, M. M. Dovek, M. D. Kirk, C. A. Lang and C. F. Quate, Appl. Phys. Lett., 5, 1727 (1989) describes research on applying a pulse voltage of 3 to 8V and 100 $\mu$s to a cleavage plane of graphite to produce a hole with diameter of 40 Å and a depth of 7 Å there and observing the hole through an STM.

Researches have been made on a technique of densely recording information on a thin film by locally modifying the electric conductivity of the material of the thin film and reproducing the recorded information. For example, K. Takimoto, R. Yano, K. Hatanaka, K. Eguchi and T. Nakagiri, OYO BUTURI 63, 470, (1994) describes a research on applying a pulse voltage to an LB film showing a very low electrodoncutivity by way of a sensing needle electrode to produce on it an area with a diameter of about 10 nm where an electric current easily flows and using it as a bit for recording information.

Similarly, there has been disclosed a technique of recording information by applying a pulse voltage to the $SiN/SiO_2$ interface of an $SiN/SiO_2/Si$ multilayer structure by means of a sensing needle electrode and implanting and storing an electric charge there and reading the recorded information by utilizing changes in the electrostatic capacitance there.

Additionally, there is also know a technique of recording information by applying a pulse voltage to a ferroelectric thin film to locally invert the spontaneous polarization of the thin film and reproducing the recorded information by directly detecting the electrostatic force between the site of spontaneous polarization and the sensing needle electrode. With this technique, it is also possible to read the recorded information by detecting changes in the electrostatic capacitance there or the displacement of the medium due to the piezoelectric effect.

These and other techniques are expected to make it possible to record information very densely.

When reading the information recorded by utilizing local changes in the electric conductivity of a recording medium, changes in the electric current flowing between the medium and the sensing needle electrode are detected. In order for the information reproducing operation to be conducted at high speed, it will be desirable to drive an AFM comprising an electrocoductive sensing needle in a contact mode and concurrently detect the electric current flowing between the medium and the sensing needle electrode. In practice, the wire extending from the sensing needle electrode or the medium is led to a current amplifier for current/voltage conversion.

However, the above described known arrangement is accompanied by the following problems.

(1) When the recording density is raised, the area assigned to a recording bit to be written is inevitably reduced. When scanning and reading such a bit at high speed, the total electric charge flowing into the sensing needle from the recording bit will also be reduced. As a result, it is difficult to detect the bit with an enhanced level of contrast. On the other hand, any attempt for improving the bit detecting sensitivity will reduce the speed of reproducing information.

(2) In view of the fact that the stray capacitance produced by the wire connecting the sensing needle electrode or the recording medium and the current amplifier can reduce the bandwidth of the current amplifier, the length of the wire should be minimized to minimize the stray capacitance in order to realize a high speed reproduction of information. However, any attempt for reducing the length of the wire encounters a limit so long as an ordinary current amplifier is used.

On the other hand, in the case of recording information by storing an electric charge or inverting the spontaneous polarization, it is desirable to drive the AFM in a contact mode in order to realize a high speed scanning operation. However, it is highly difficult to directly detect the electrostatic force in a contact mode. In the case of detecting changes in the electrostatic capacitance or in the displacement of the recording medium as a result of piezoelectric effect, it is necessary to detect the response of the electric current or that of the displacement of the elastic body to an application of an AC voltage.

In the former case, the use of a complex detection system is required for lock-in detection and a problem of a reduced bandwidth arises due to a stray capacitance as in the case of directly detecting the electric current (see problem (2) above).

In the latter case, a frequency lower than the resonance frequency of the elastic body has to be used for the AC voltage to be applied, consequently giving rise to a new restriction on the scanning speed to a significant disadvantage for a high speed information reproducing operation.

SUMMARY OF THE INVENTION

Therefore, it is an object of the present invention to solve the above identified problems of the known techniques by providing a probe adapted to reproduce information at high speed with an improved bit detection sensitivity even when recording bits are highly densely formed.

Another object of the present invention is to provide an information recording/reproduction apparatus comprising such a probe.

According to an aspect of the invention, the above objects are achieved by providing a probe comprising:
a cantilever having a movable end and formed from an elastic body;
an electroconductive sensing needle arranged at the movable end of the cantilever; and
a field effect transistor arranged at the movable end of the cantilever and having a gate electrode electrically connected to the electroconductive sensing needle.

According to another aspect of the invention, there is also provided a method of manufacturing a probe comprising steps of:

preparing a substrate at least having a semiconductor layer on the surface;
forming a field effect transistor having a gate electrode in the semiconductor layer;
forming an electroconductive sensing needle on the gate electrode; and
processing the substrate to produce a movable end out of the portion thereof where said field effect transistor is formed.

DETAILED DESCRIPTION OF THE PREFERRED EMBODIMENTS

Figure 1:
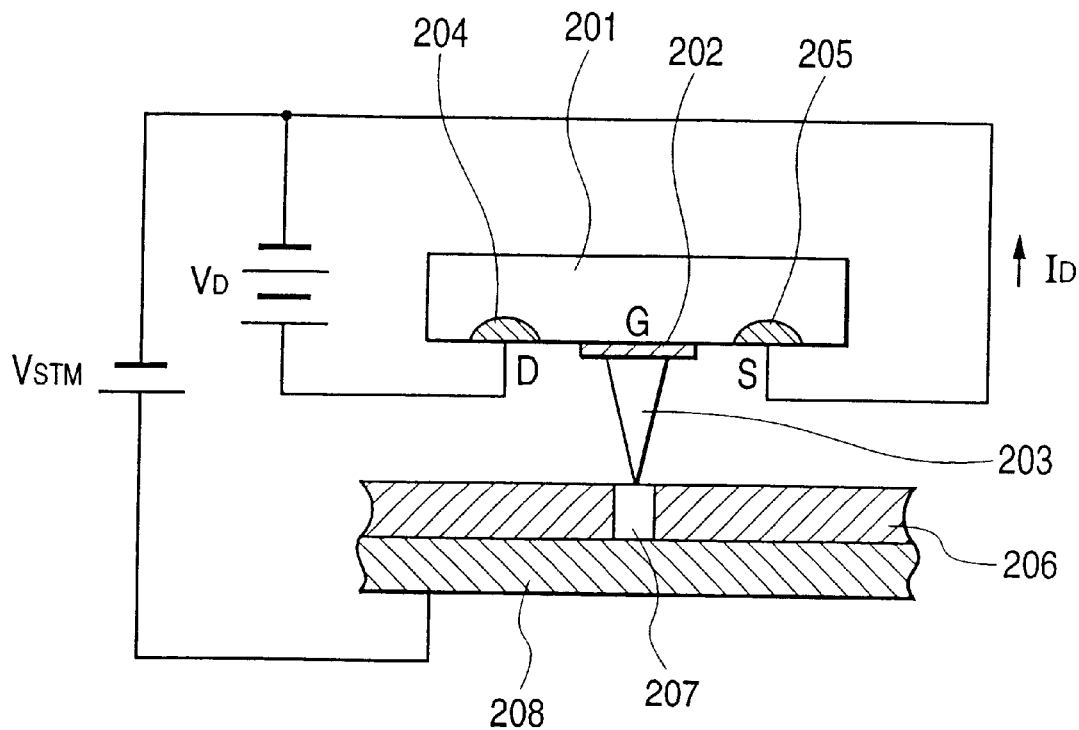
FIG. 1 is a schematic illustration of a probe according to the invention, showing its basic configuration.

The recording medium to be replayed by a probe according to the invention carries binary information recorded on it. Therefore, it is sufficient for the probe to discriminate "0" from "1" when reproducing the information recorded on the recording medium. While a detection system like that of an SPM is used in a probe according to the invention to detect the interaction of the sensing needle and the surface of the specimen, the detection system of a probe according to the invention is not necessarily required to show a linear relationship between the input signal and the output signal. In other words, it is sufficient for a probe according to the invention to comprise at least a detection circuit adapted to output a binary signal for a change in the interaction exceeding a threshold level that is produced by the presence or absence of a recording bit.

Thus, according to the invention, when a recording bit that has been recorded on the recording medium as a local change of electric conductivity, the presence or absence of a recording bit is converted into a difference in the electric potential of the electrocoductive sensing needle and the channel between the drain and the source of the field effect transistor is turned ON/OFF or the channel resistance is modulated depending on the difference in the gate voltage of the transistor so as to output a binary signal corresponding to the recorded information.

With the above described arrangement of the present invention, the bit can be detected with a high degree of contrast if the total electric charge flowing into the sensing needle is reduced. Additionally, since the field effect transistor is arranged very close to the electroconductive sensing needle and the sensing needle is held in direct contact with the gate of the transistor, the wire connecting the sensing needle and the detection circuit is made ideally short to minimize the stray capacitance therebetween so that the information densely recorded on the recording medium can be reproduced at high speed without reducing the bandwidth of the detection circuit.

If information is recorded by locally inverting the spontaneous polarization of the recording medium that is made of a ferroelectric thin film, the presence or absence of a recording bit, or the presence or absence of a stored electric charge or the difference in the orientation of polarization, is converted into a difference in the electric potential of the electroconductive sensing needle or a difference in the orientation of dielectric polarization in the electroconductive sensing needle and the channel between the drain and the source of the field effect transistor is turned ON/OFF or the channel resistance is modulated depending on the difference in the gate voltage of the transistor so as to output a binary signal corresponding to the recorded information. As a result, a simple detection system can be used if compared with an arrangement for detecting a change in the electrostatic capacitance or a displacement of the recording medium due to a piezoelectric effect. Additionally, according to the present invention, it is possible to reproduce information at high speed because no modulation is required. Still additionally, since the field effect transistor is arranged very close to the electroconductive sensing needle and the sensing needle is held in direct contact with the gate of the transistor, the wire connecting the sensing needle and the detection circuit is made ideally short to minimize the stray capacitance therebetween so that the information densely recorded on the recording medium can be reproduced at high speed without reducing the bandwidth of the detection circuit.

In any case, while a field effect transistor to be used for the purpose of signal detection takes an area of more than 1 $\mu m^2$ according to any known device forming process, the metal-made sensing needle is held in direct contact with the gate of the transistor so that the spatial resolution of the microscope is dominated by the profile of the tip of the sensing needle and a high spatial resolution of the order of nanometers is realized.

If a method of bonding a metal thin film formed in a recess of a silicon single crystal substrate by way of a peeling layer on the metal bonding layer of an elastic body under pressure to transfer the profie of the recess is used, the step of forming a field effect transistor on the elastic body and that of forming a sensing needle are made independent relative to each other to broaden the freedom of designing the arrangement of placing the field effect transistor on the elastic body and that of forming the field effect transistor.

Now, the present invention will be described in greater detail by referring to the accompanying drawings. FIG. 1 is a schematic illustration of a probe according to the invention, showing its basic configuration. Referring to FIG. 1, the probe comprises a cantilever main body 201 made of a p-type semiconductor that is typically Si doped with impurities of B, Ga and In and having two n-type semiconductor regions 204, 205 that are doped with impurities of As, P and Sb.

The two n-type semiconductor regions 204, 205 are used as source (S) and drain (D). In FIG. 1, reference symbol 202 denotes an insulation layer made of $SiO_2$ and used as gate (G) insulation layer.

In FIG. 1, reference symbol 203 denotes an electroconductive sensing needle typically made of Pt (platinum), Au (gold) or W (tungsten). The electroconductive sensing needle 203 is connected to an electrode formed on the insulation layer 202 and operate as a gate with the electrode. Thus, a field effect transistor (FET) is formed from these components.

Reference symbols 206 and 207 denote respective portions of a thin film adapted to record information as a function of a local change in the electric conductivity. Reference symbol 208 denotes a substrate of an electroconductive metal such as Au. Reference symbol 206 denotes a low conductivity portion and reference symbol 207 denotes a high conductivity portion of the thin film. Voltage $V_{STM}$ is applied between the metal substrate 208 and the source S, while voltage $V_D$ is applied between the drain D and the source S.

Figure 2A:
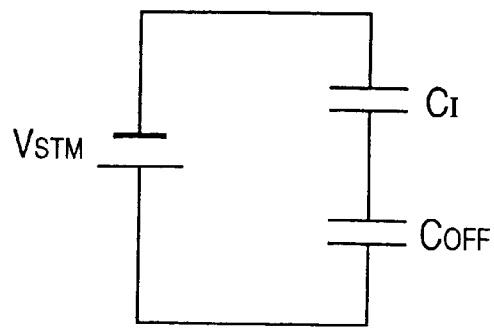
FIGS. 2A and 2B are equivalent circuit diagrams of the probe of FIG. 1.
Figure 2B:
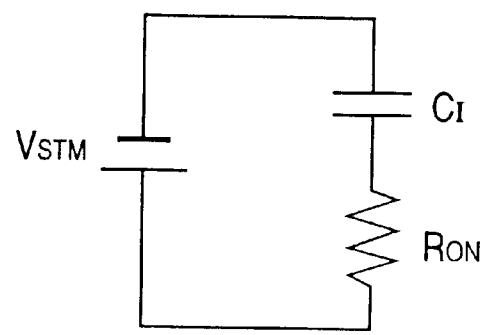

FIGS. 2A and 2B are simplified equivalent circuit diagrams of the probe of FIG. 1, illustrating the voltage applied to the gate G when the electroconductive sensing needle 203 contacts the low conductivity portion 206 and the high conductivity portion 207 respectively. More specifically, FIG. 2A shows an equivalent circuit when the electroconductive sensing needle 203 contacts the low conductivity portion 206. The low conductivity portion 206 of the thin film practically does not conduct any electric current and operates as a capacitor. If the capacitance of the insulation layer 202 of the gate G is $C_I$ and that of the low conductivity portion 206 is $C_{OFF}$ when the voltage $V_{STM}$ is applied, the voltage applied to the gate G of the FET is expressed by $C_{OFF}V_{STM}/(C_{OFF}+C_I)$. FIG. 2B shows an equivalent circuit when the electroconductive sensing needle 203 contacts the high conductivity portion 207. The high conductivity portion 207 of the thin film operates as resistor. If the resistance of the high conductivity portion 207 is $R_{ON}$ when the voltage $V_{STM}$ is applied, no electric current flows through this circuit in a steady state. Thus the voltage applied to the gate G of the FET is expressed by $V_{STM}$.

Generally, if the voltage $V_D$ applied to the drain D of an n-type channel enhancement mode MOSFET is constant, the electric current I flowing between the drain D and the source S dramatically increases when the voltage $V_G$ of the gate G exceeds a threshold value $V_T$. Therefore, the voltage $V_{STM}$ should be such that the voltage $C_{OFF}V_{STM}/(C_{OFF}+C_I)$ of the gate G is lower than the threshold value $V_T$ when the electrocoductive sensing needle 203 contacts the low conductivity portion 206 and the voltage $V_S$ of the gate G is higher than the threshold value $V_T$ when the electrocoductive sensing needle 203 contacts the high conductivity portion 207. While the above description is made in terms of n-type channel enhancement mode MOSFET, a similar effect can be achieved according to the invention if a p-type channel MOSFET or a depression type MOSFET is used.

When information is recorded by storing locally an electric charge on a recording medium or by locally inverting the spontaneous polarization of the recording medium that is made of a ferroelectric thin film, the presence or absence of a recording bit, or the presence or absence of a stored electric charge or the difference in the orientation of polarization, is converted into a difference in the electric potential of the electrocoductive sensing needle or a difference in the orientation of dielectric polarization in the electrocoductive sensing needle. The gate voltage of the field effect transistor in the vicinity of the threshold value $V_T$ is fluctuated by that conversion, and the channel between the drain and the source of the field effect transistor is turned ON/OFF or the channel resistance is modulated depending on the difference in the gate voltage of the transistor so as to output a binary signal corresponding to the recorded information.

Now, a reproduction apparatus realized by applying the present invention will be described by referring to FIG. 3. A plurality of probes 1005 are arranged in such a way that their respective sensing needles 1004 arranged at the front ends thereof contact a recording medium comprising an electrocoductive substrate 1001 and a recording layer 1002. The sensing needle 1004 of each of the probes 1005 is supported by a cantilever of an elastic body 1006 that is elastically deformed or deflected. The probes are supported by a common support as integral parts thereof. If the elastic constant of the deflecting cantilever 1006 is about 0.1[N/m] and its elastic deformation is about 1[μm], the contact force of the sensing needle relative to the recording medium will be about $10^{-7}$[N].

When operating a reproduction apparatus as described above, an xyz stage 1008 fitted to the recording medium 1003 is driven by an xyz drive mechanism 1007 according to a position control signal from a position control circuit 1013 that is held under control of a control computer 1014 so that the probes 1005 and the recording medium 1003 are three-dimensionally moved relative to each other. The positions of the probes 1005 are directionally regulated in the xy-direction and the z-direction so that tips of their sensing needles 1004 contact the surface of the recording medium 1003 at desired respective positions with desired respective levels of contact force.

When the probes 1005 of a reproduction apparatus having a configuration as described above are driven to scan the recording medium 1005, the tips of the sensing needles 104 of the respective probes 1005 are constantly held in contact with the recording medium 1003. With this contact scanning system of scanning the recording medium 1003 by means of the sensing needles whose tips are constantly held in contact with the recording medium 1003, the undulations, if any, of the surface of the recording medium 1003 are absorbed by elastic deformations of the cantilevers 1006 so that the contact force between the tips of the sensing needles 1004 and the surface of the recording medium 1003 is substantially held to a constant level and hence the tips of the sensing needles 1004 would not damage the surface of the recording medium 1003. This system is simple because it does not require the use of piezoelectric elements for aligning individual probes in the z-direction and hence it is particularly adapted to an apparatus comprising a relatively large number of probes. Additionally, the probes 1005 can be made to scan the recording medium 1003 at high speed because they do not require a feedback control mechanism for controlling them in the z-direction relative to the recording medium 1003.

The recording layer 1002 of the recording medium 1003 is typically made of a material that can change the intensity of the electric current running therethrough as a function of the voltage applied thereto.

A specific example of film material that can be used for the recording layer 1002 is an LB film (built-up film of organic monomolecular film layers formed by the Langmuir-Blodgett technique) made of polyimide or SOAZ (squarylium-bis-(6-octylazulene)) as disclosed in Japanese Patent Applications Laid-Open Nos. 63-161552 and 63-161553. With this materials, the electric conductivity of the LB film changes (from OFF state to ON state) when a voltage (about 5 to 10[V]) exceeding a threshold level is applied to the probes-LB film-substrate to increase the electric current when a bias voltage (about 0.01 to 2[V]) is applied for information reproduction. When a recording medium having such a recording layer is used, the recorded dots show an electric conductivity higher than that of the surrounding areas.

A second specific example includes amorphous thin film materials such as GeTe, GaSb and SnTe. Any of these materials produces a phase transition of amorphous→crystalline when a voltage is applied between the probes-amorphous thin film material-substrate to cause an electric current to flow therethrough and generate heat. As a result, the electric conductivity of the material changes to increase the electric current when a bias voltage is applied for information reproduction.

A third specific example includes oxidizing metals and semiconductors such as Zn, W, Si and GaAs. Any of these materials reacts with moisture adsorbed by the surface and oxygen in the atmosphere to produce an oxide film on the surface when an electric current is made to flow therethrough by applying a voltage to the probes-oxidizing metal or semiconductor. As a result, the contact resistance of the material surface changes to reduce the electric current flowing therethrough when a bias voltage is applied for information reproduction. When a recording medium having such a recording layer is used, the recorded dots show an electric conductivity lower than that of the surrounding areas. A material that can locally store an electric charge in the recording layer 1001 or locally invert the polarity of the recording layer 1001 by applying a voltage thereto may also be used for the recording layer. If such is the case, the recorded information can be reproduced by directly detecting the stored electric charge or the polarized electric charge or by detecting the change in the electric potential on the surface of the recording medium.

There are two types of recording medium that can be used with the technique of storing electric charges in the recording medium by applying a voltage. One is the type of Si nitride layer/Si oxide layer/Si substrate (NOS) and the other is the type of Si oxide layer/Si nitride layer/Si oxide layer/Si substrate (ONOS). While the two types resemble each other in that electric charges are stored on and near the interface of the Si oxide layer and the Si nitride layer, the ONOS type can more advantageously be used because the bit diameter can be reduced for storing an electric charge on and near the surface and hence bits can be arranged more densely.

Materials that can invert the polarity by applying voltage include ferroelectric materials. Examples of ferroelectric material include $PbTiO_3$, $Bi_4Ti_3O_{12}$, $BaTiO_3$, $LiNbO_3$, $LiTaO_3$, PZT (lead titanate zirconate), PLZT (lanthanum lead titanate zirconate), VDF/TrFE (vinylidene fluoride/ethylene trifluoride) copolymer, PVDF (vinylidene polyfluoride) and other ferroelectric polymers. Any of these materials may be applied to the present invention. A recording medium comprises a lower electrode layer and an upper ferroelectric layer, of which the lower electrode layer may be made of metal such as Au or Pt or a semiconductor such as Si. A pulse voltage is applied between the probe electrodes and the lower electrode layer of the recording medium and the orientation of spontaneous polarization of the recording medium is determined relative to the polarity of the pulse voltage to record information when an electric field greater than the coercive electric field of the ferroelectric material is applied to the recording medium.

Now, the bit recorded on the recording medium is reproduced in a manner as described below. A bias voltage is applied between the source of each of the probes and the recording medium 1003 by means of a bias application circuit 1010 so that the gate voltage may be modulated at the threshold value depending on the presence or absence of a recording bit. Then, voltage $V_D$ is applied to the drain of each of the probes by way of a resistor. The ON/OFF state of the channel between the drain and the source of each of the probes produced as a result of modulation depending on the presence or absence of a recording bit is converted into a change of voltage and output to reproduction control circuit 1012. The reproduction control circuit 1012 forms a reproduction signal on the basis of the obtained voltage signals and outputs it to the control computer. Note that the wire leading to each of the probes including the drain resistor (1015 in FIG. 3), the reproduction control circuit and the bias voltage application circuit may be integrally formed on support 1009. While the above described reproduction circuit comprises a plurality of probes, a reproduction apparatus comprising only a single probe may also feasibly be used for the purpose of the present invention.

Now, the present invention will be described by way of examples.

EXAMPLE 1

Figure 4:
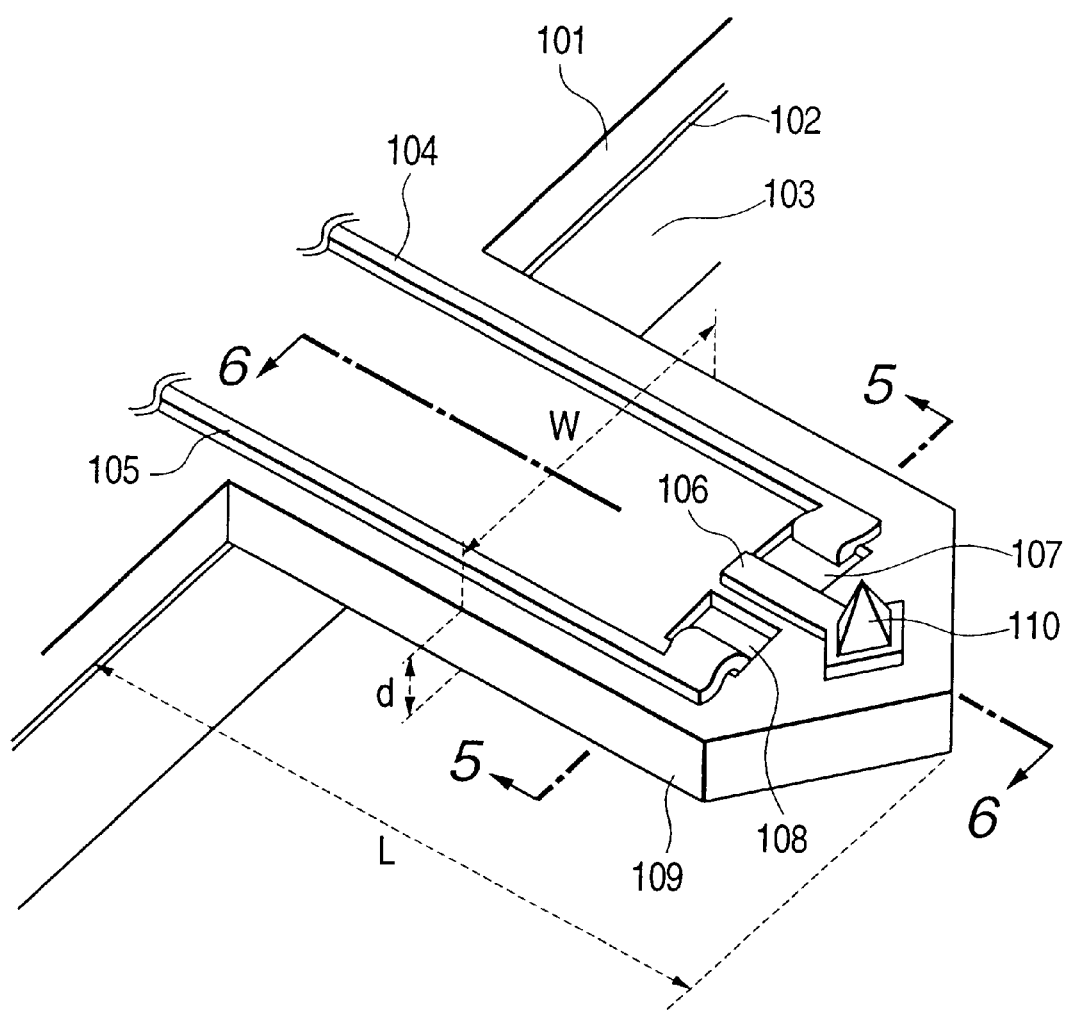
FIG. 4 is a schematic perspective view of a first embodiment of a probe according to the invention.
Figure 5:
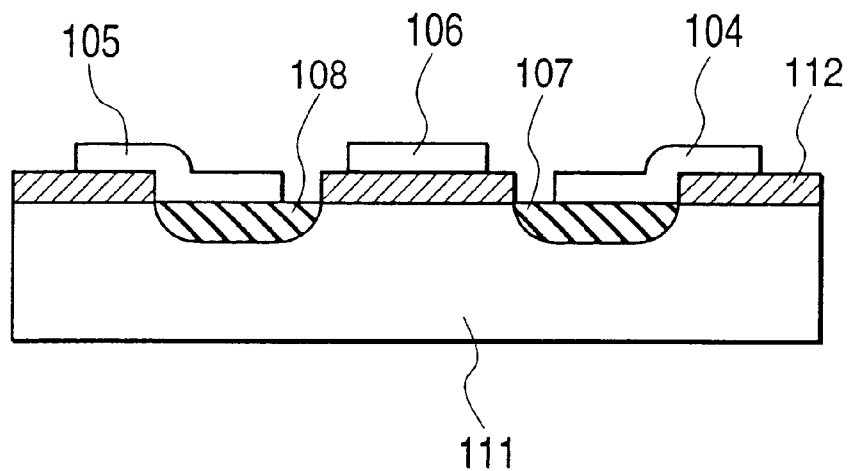
FIG. 5 is a schematic cross sectional view of the first embodiment of probe taken along line 5—5 in FIG. 4.
Figure 6:
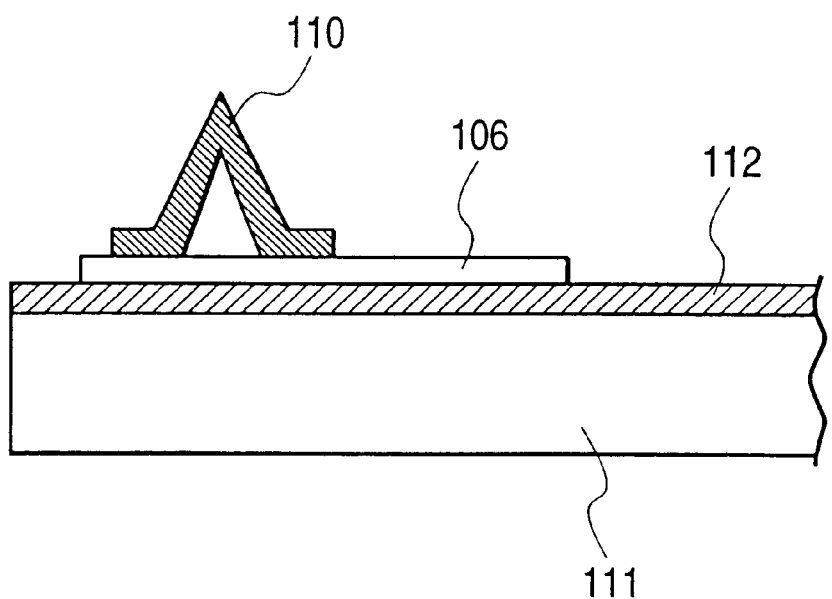
FIG. 6 is a schematic cross sectional view of the first embodiment of probe taken along line 6—6 in FIG. 4.

FIGS. 4 through 6 illustrate the configuration of the cantilever of this embodiment. FIG. 4 is a schematic perspective view of the front end of the cantilever.

Referring to FIG. 4, there are shown a 5 μm thick p-type Si single crystal thin film (plane bearing of plane (100)) 101, a 1 μm thick $SiO_2$ thin film 102 and an Si single crystal substrate 103 with a plane bearing of plane (100). The Si substrate 103 is 0.5 mm thick. The p-type Si single crystal thin film 101 is partly projecting from the Si substrate 103 to operate as cantilever main body 109. The upper surface of the cantilever main body 109 is covered by an $SiO_2$ thin film. Dimensions of a length of L=800 μm, a width of W=200 μm and a height of d=5 μm were selected for the cantilever main body 109. As a result, a cantilever showing an elastic constant of about 1.7[N/m] for deflection was obtained. A pyramid-shaped sensing needle 110 and a gate electrode 106 connected to the sensing needle 110 are arranged on the front end of the cantilever main body 109. Both the sensing needle 110 and the gate electrode 106 are made of gold (Au). The gate electrode 106 is provided at the opposite lateral sides thereof with respective windows formed by removing the $SiO_2$ thin film. Also, n-type Si regions 107, 108 were respectively formed in the windows. Aluminum electrodes 104, 105 are fitted respectively to the n-type Si regions 107, 108. Thus, a field effect transistor (FET) is formed at and near the front end of the cantilever main body 109, where the sensing needle 110 and the gate electrode 106 operate as a gate while n-type Si regions 107, 108 operate respectively as a drain and source. FIG. 5 is a schematic cross sectional view taken along line 5—5 in FIG. 4 and FIG. 6 is a schematic cross sectional view taken along line 6—6 in FIG. 4. It will be seen that the n-type Si regions 107, 108 were formed in the respective windows produced by removing the $SiO_2$ thin film 112 and Al electrodes 104, 105 were fitted respectively thereto. The gate electrode 106 is arranged on the $SiO_2$ thin film 112 and connected to the sensing needle 110.

Now, the method of preparing the cantilever used in this example will be described by referring to FIGS. 7A through 7H.

Figure 7A:
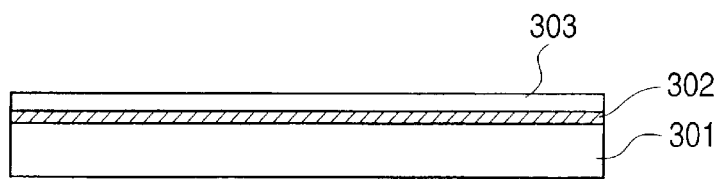
FIGS. 7A, 7B, 7C, 7D, 7E, 7F, 7G and 7H are schematic cross sectional views of the cantilever of the first embodiment of the probe, showing different manufacturing steps thereof.

In this example, the substrate is a multilayer structure comprising a 0.5 mm thick Si crystal substrate 301 with a plane bearing of plane (100), a 1 μm thick $SiO_2$ thin film 302 operating as insulation layer and a 5 μm thick Si single crystal thin film 303 as shown in FIG. 7A. Such a structure is referred to as SOI (silicon on insulator). In this example, the 5 μm thick Si single crystal thin film 303 on the $SiO_2$ thin film 302 is a p-type Si single crystal thin film doped with boron atoms as impurity.

Figure 7B:
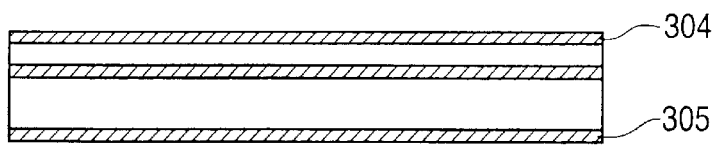

Firstly, as shown in FIG. 7B, $SiO_2$ thin films 304, 305 are formed on the upper and lower surfaces of the SOI by thermal oxidation.

Figure 7C:
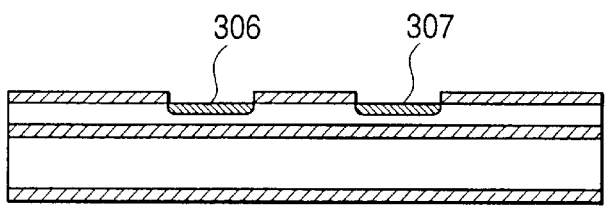

Then, as shown in FIG. 7C, window areas are formed in the $SiO_2$ thin film 304 by means of photolithography and etching and phosphor (P) atoms are introduced as impurity by means of ion implantation. P atoms are accelerated by 50 to 100 keV and the windows are exposed to a dose (the number of ion atoms implanted by 1 $cm^2$ of the surface of the semiconductor) of about $10^{13}$ $cm^{-2}$. Then, the windows are heat treated (at 600 to 700° C. for 30 minutes) to heal the damage to the crystal lattice. As a result, n-type Si regions 306, 307 are produced.

Figure 7D:
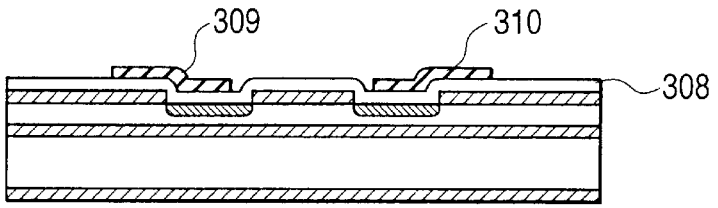

Then, aluminum is deposited on the $SiO_2$ thin film 304 and the n-type Si regions 306, 307 by evaporation to produce a thin film 308. Then, a resist layer is formed and patterned by photolithography to produce resist patterns 309, 310 that correspond to respective electrode patterns as shown in FIG. 7D.

Figure 7E:
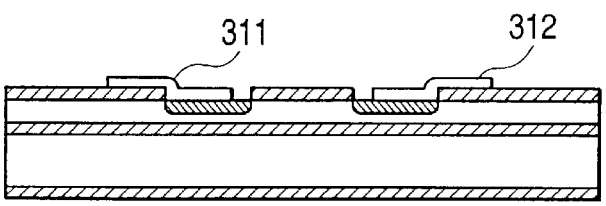

Then, the area of the aluminum thin film 308 not covered by the resist layer is etched out and then the resist patterns 309, 310 are removed. Thus, aluminum electrodes 311, 312 as shown in FIG. 7E are produced.

Figure 7F:
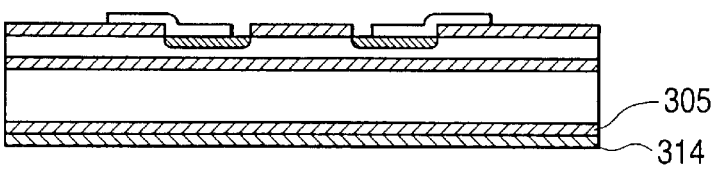

Subsequently, as shown in FIG. 7F, a 0.5 μm thick silicon nitride film 314 is formed on the rear surface of the Si substrate 301.

Figure 7G:
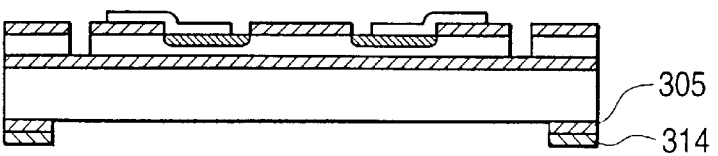

Thereafter, as shown in FIG. 7G, a resist pattern is formed for the cantilever main body by photolithography and the Si single crystal thin film 303 is etched to form a pattern corresponding to the profile of the cantilever by dry-etching. Then, the silicon nitride film 314 and the $SiO_2$ thin film 305 on the rear surface are also etched to form a pattern to be used as an etching mask.

Figure 7H:
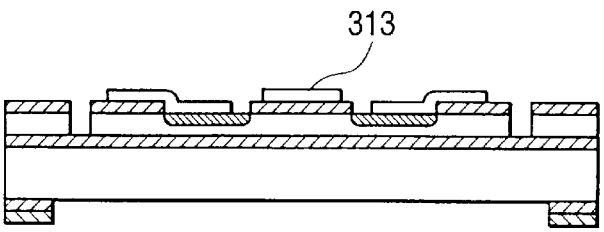

Finally, as shown in FIG. 7H, titanium Ti and gold Au films are formed on the front surface to respective thicknesses of 3 nm and 50 nm and then patterned by photolithography and etching to produce a bonding layer and a gate electrode 313.

FIGS. 8A through 8E schematically illustrate steps of forming a sensing needle to be fitted to the cantilever of this example.

Figure 8A:
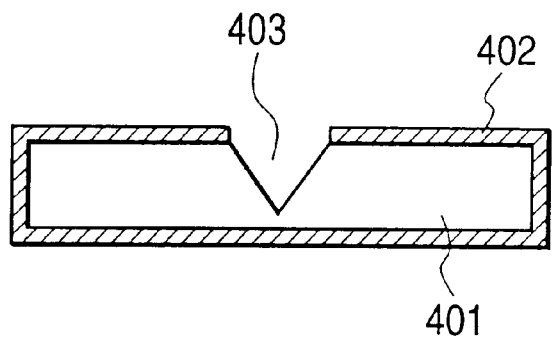
FIGS. 8A, 8B, 8C, 8D and 8E are schematic cross sectional views of the sensing needle of the first embodiment of the probe, showing different manufacturing steps thereof.

Firstly as shown in FIG. 8A, a thermal oxide film was formed as protection layer 402 on an Si single crystal substrate 401 with a plane bearing of plane (100). Then, the protection layer 402 was removed in a desired area thereof by a patterning operation using photolithography and etching to expose a 6 $\mu$m square area of the silicon substrate. Then, the silicon of the patterned area was etched out by means of etching that is anisotropic relative to the crystallographic axis, using an aqueous solution of potassium hydroxide. More specifically, a 30% aqueous solution of potassium hydroxide was used with solution temperature of 90° C. and the duration of the etching operation was 15 minutes. As a result, an inverted-pyramid-shaped recess 403 surrounded by four planes, each being equivalent to plane (111), and having a depth of about 4 $\mu$m was produced.

Figure 8B:
Figure 8C:
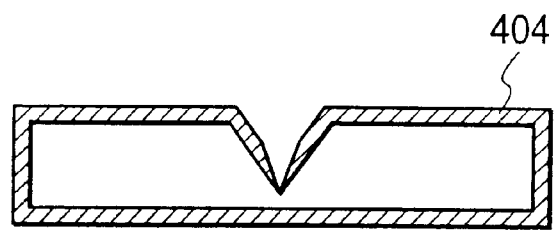

Then, as shown in FIG. 8B, the thermal oxide film of the protection layer 402 was removed by means of an aqueous solution of a mixture of hydrofluoric acid and ammonium fluoride ($HF:NH_4F=1:5$). Thereafter, the substrate 401 was washed with a mixture solution of sulfuric acid and hydrogen peroxide heated to 120° C. and a 2% aqueous solution of hydrofluoric acid. Then, the substrate 401 was heated in an atmosphere of oxygen and hydrogen to 1,000° C. in an oxidizing furnace to deposit silicon dioxide by 400 nm for a peeling layer 404 as shown in FIG. 8C.

Figure 8D:
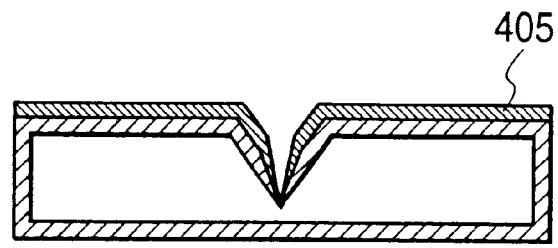
Figure 8E:
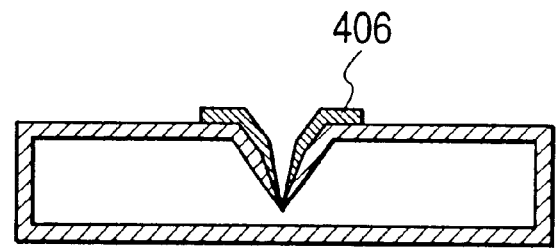

Subsequently, a sensing needle 406 was formed there. Firstly, as shown in FIG. 8D, a gold Au film was formed to a thickness of 300 nm by vacuum evaporation for the sensing needle 406. Then, the layer 405 of the sensing needle 406 is patterned by photolithography and etching to actually produce a sensing needle 406 as shown in FIG. 8E.

FIGS. 9A through 9F schematic illustrate steps of bonding the sensing needle onto the cantilever under pressure and producing a finished cantilever.

Figure 9A:
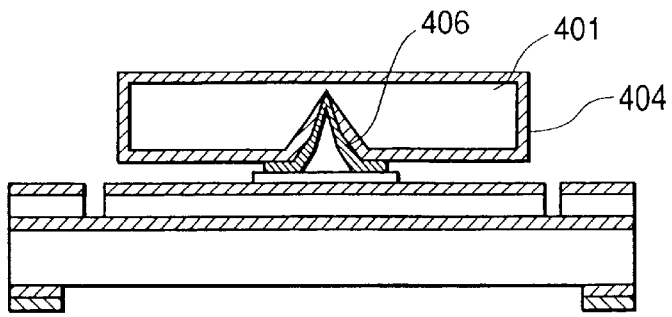
FIGS. 9A, 9B, 9C, 9D, 9E and 9F are schematic cross sectional views of the first embodiment of the probe, showing different steps of bonding the sensing needle onto the cantilever.
Figure 9B:
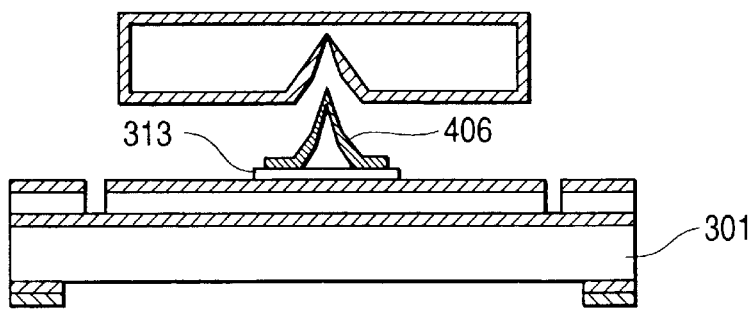

Firstly, as shown in FIG. 9A, the sensing needle 406 was aligned with the bonding layer 313 on the cantilever, placed vis-a-vis and held in contact with the latter. Then, the sensing needle 406 was bonded to the bonding layer 313 by applying a load on them. Then, as shown in FIG. 9B, the two substrates (301, 401) were pulled away from each other to separate the peeling layer 404 and the sensing needle 406 along the interface thereof.

Figure 9C:
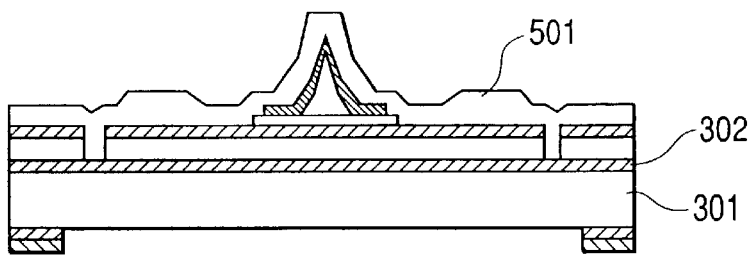
Figure 9D:
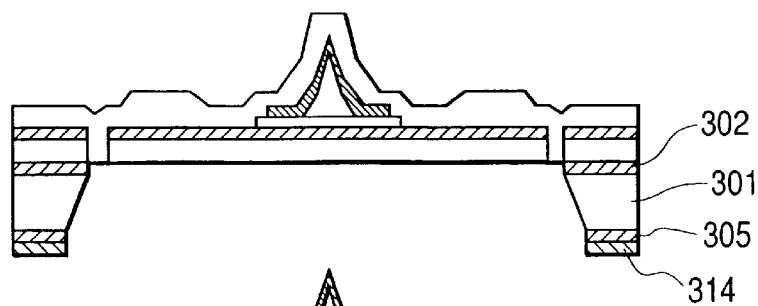
Figure 9E:
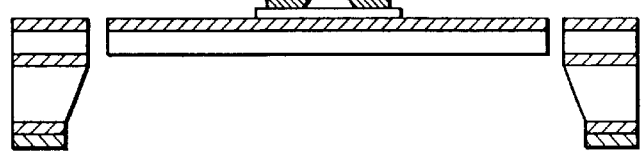

Subsequently, as shown in FIG. 9C, a polyimide layer was formed on the entire surface by applying polyimide by means of a spin coating technique and baked to produce a surface protection layer 501. Then, as shown in FIG. 9D, the substrate 301 was etched from the rear surface by means of a 30% aqueous solution of potassium hydroxide heated to 90° C., using the silicon nitride layer 314 on the rear surface as etching mask. Thereafter, the $SiO_2$ thin film 302 was removed by means of an aqueous solution of a mixture of hydrofluoric acid and ammonium fluoride.

Figure 9F:
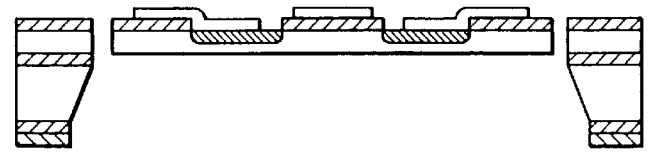

Finally, as shown in 9E, a cantilever type probe was prepared by removing the surface protection layer 501 by means of oxygen plasma. FIG. 9F shows a cross sectional view of the cantilever including the FET section (as taken along line 5—5 in FIG. 4).

A reproduction apparatus having a configuration as described above was prepared by using the above cantilever type probe to find that it could reproduce highly densely recorded information at high speed with a bit detection sensitivity significantly improved from the conventional sensitivity level.

EXAMPLE 2

In this example, a metal pillar made to grow by irradiating a cantilever with an electron beam at a point of the front end thereof in an atmosphere containing a metal complex was used for the sensing needle of the cantilever.

Figure 10:
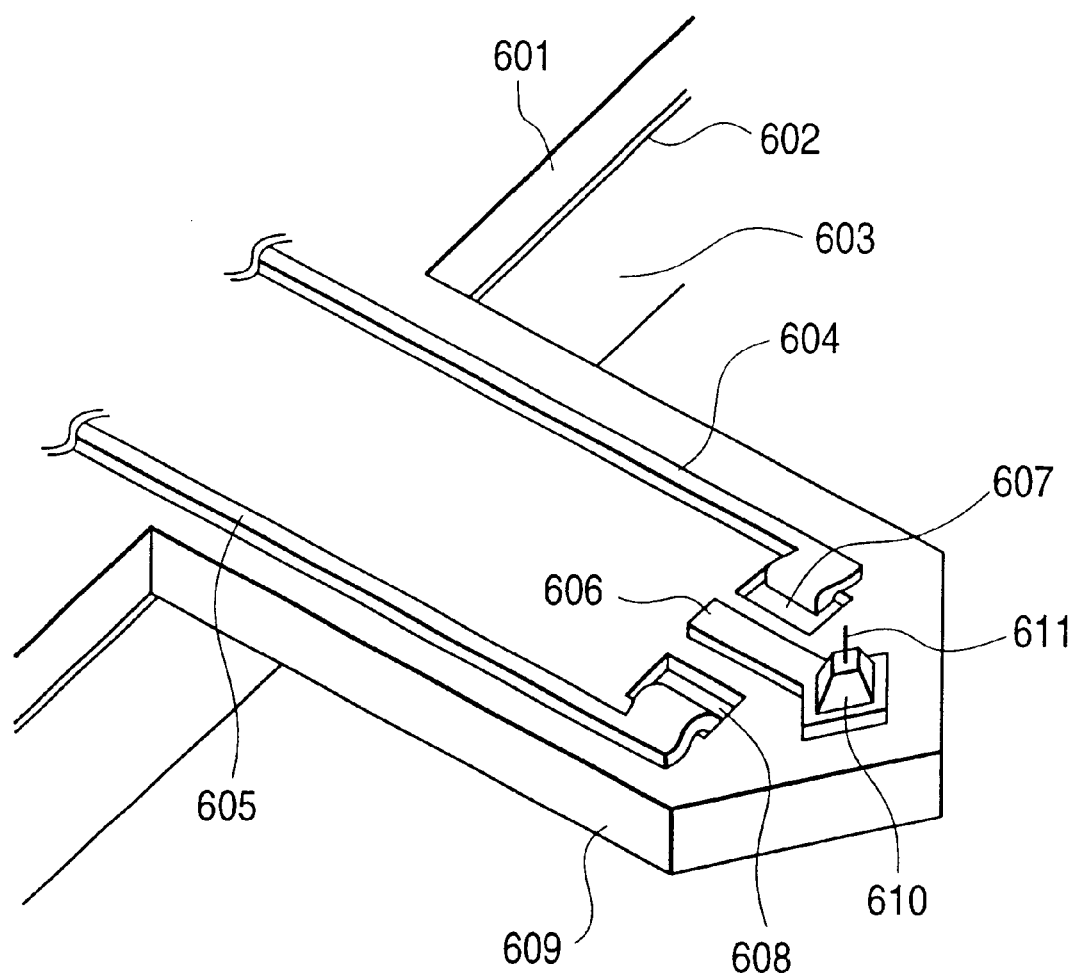
FIG. 10 is a schematic perspective view of a second embodiment of the probe according to the invention.

FIG. 10 is a schematic perspective view of a front end portion of the cantilever prepared in this example. Referring to FIG. 10, there are shown a 5 $\mu$m thick p-type Si single crystal thin film 601, a 1 $\mu$m thick $SiO_2$ thin film 602 and an Si crystal substrate 603 with a plane bearing of plane (100). The Si substrate 603 is 0.5 mm thick. The p-type Si single crystal thin film 601 is partly projecting from the Si substrate 603 to operate as cantilever main body 609. The upper surface of the cantilever main body 609 is covered by an $SiO_2$ thin film. A pillar-shaped sensing needle 611, a seat 610 and an electrode 606 connected to the seat 610 are arranged on the front end of the cantilever main body 609. The sensing needle 611, the seat 610 and the electrode 606 are made of gold (Au). The gate electrode 606 is provided at the opposite lateral sides thereof with respective windows formed by removing the $SiO_2$ thin film. Also, n-type Si regions 607, 608 were respectively formed in the windows. Aluminum electrodes 604, 605 are fitted respectively to the n-type Si regions 607, 608. Thus, a field effect transistor (FET) is formed at and near the front end of the cantilever main body 609, where the sensing needle 611, the seat 610 and the gate electrode 606 operate as gate while n-type Si regions 607, 608 operate respectively as a drain and source.

FIGS. 11A through 11G illustrate the operation of forming a sensing needle, bonding it to a cantilever under pressure and finishing the cantilever by etching from the rear surface thereof. This operation constitutes part of the process of manufacturing a cantilever having a configuration as that of the cantilever prepared in this example. A FET and a bonding layer 313 were formed in the cantilever of this example as in Example 1.

Figure 11A:
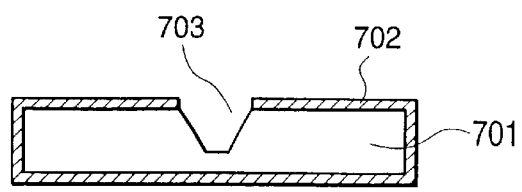
FIGS. 11A, 11B, 11C, 11D, 11E, 11F and 11G are schematic cross sectional views of the second embodiment of the probe, showing different manufacturing steps.

Firstly as shown in FIG. 11A, a thermal oxide film was formed as protection layer 702 on an Si single crystal substrate 401 with a plane bearing of plane (100). Then, the protection layer 702 was removed in a desired area thereof by a patterning operation using photolithography and etching to expose a 6 $\mu$m square area of the silicon substrate. Then, the silicon of the patterned area was etched out by means of etching that is anisotropic relative to the crystallographic axis, using an aqueous solution of potassium hydroxide. More specifically, a 30% aqueous solution of potassium hydroxide was used with solution temperature of 90° C. and the duration of the etching operation was 15 minutes. As a result of the crystal axis anisotropic etching, a recess 703 showing a frustum-shaped cross section and surrounded by four planes, each being equivalent to plane (111). The etching time was so regulated as to produce a square bottom with a side of 2 to 0.5 $\mu$m for the recess 703.

Figure 11B:
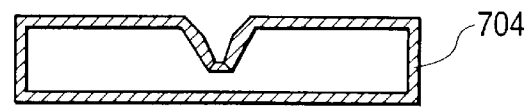

Then, the thermal oxide film of the protection layer 702 was removed by means of an aqueous solution of a mixture of hydrofluoric acid and ammonium fluoride (HF:NH$_4$F= 1:5). Thereafter, the substrate 701 was washed with a mixture solution of sulfuric acid and hydrogen peroxide heated to 120° C. and a 2% aqueous solution of hydrofluoric acid. Then, as shown in FIG. 11B, the substrate 701 was heated in an atmosphere of oxygen and hydrogen to 1,000° C. in an oxidizing furnace to deposit silicon dioxide by 400 nm for a peeling layer 704.

Figure 11C:
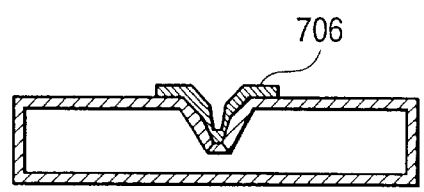

Subsequently, a sensing needle 706 was formed there. Firstly, a gold Au film was formed to a thickness of 300 nm by vacuum evaporation for the sensing needle 706. Then, the material of the sensing needle 706 is patterned by photolithography and etching to actually produce a sensing needle 706 as shown in FIG. 11C.

Figure 11D:
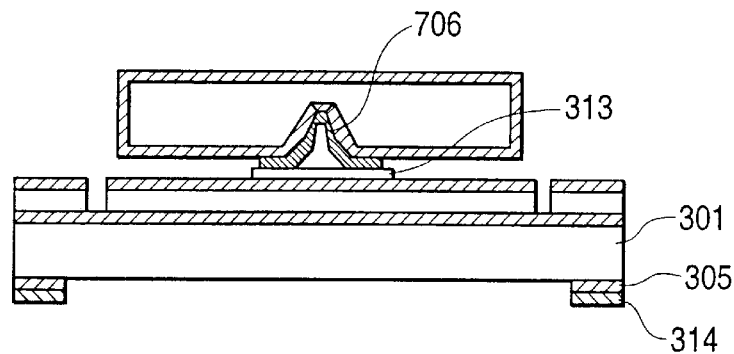
Figure 11E:
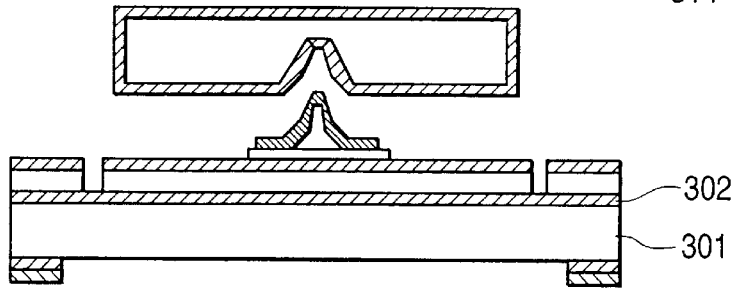

Then, as shown in FIG. 11D, the sensing needle 706 was aligned with the bonding layer 313 on the cantilever, placed vis-a-vis and held in contact with the latter. Then, the sensing needle 706 was bonded to the bonding layer 313 by applying a load on them. Then, as shown in FIG. 11E, the two substrates (301, 701) were pulled away from each other to separate the peeling layer 704 and the sensing needle 706 along the interface thereof.

Figure 11F:
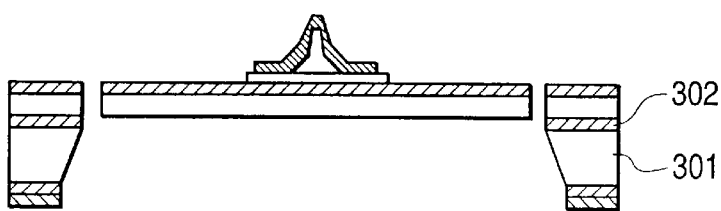
Figure 11G:
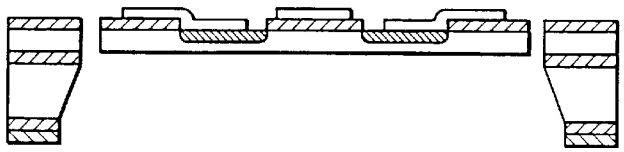

Subsequently, a polyimide layer was formed on the entire surface by applying polyimide by means of a spin coating technique and baked to produce a surface protection layer. Then, as shown in FIG. 11F, the substrate 701 was etched from the rear surface by means of a 30% aqueous solution of potassium hydroxide heated to 90° C., using the silicon nitride layer 314 on the rear surface as an etching mask. Thereafter, the SiO$_2$ thin film 302 was removed by means of an aqueous solution of a mixture of hydrofluoric acid and ammonium fluoride. Finally, a cantilever type probe was prepared by removing the surface protection layer by means of oxygen plasma. FIG. 11G shows a cross sectional view of the cantilever including the FET section (as taken along line 5—5 in FIG. 4).

Figure 12:
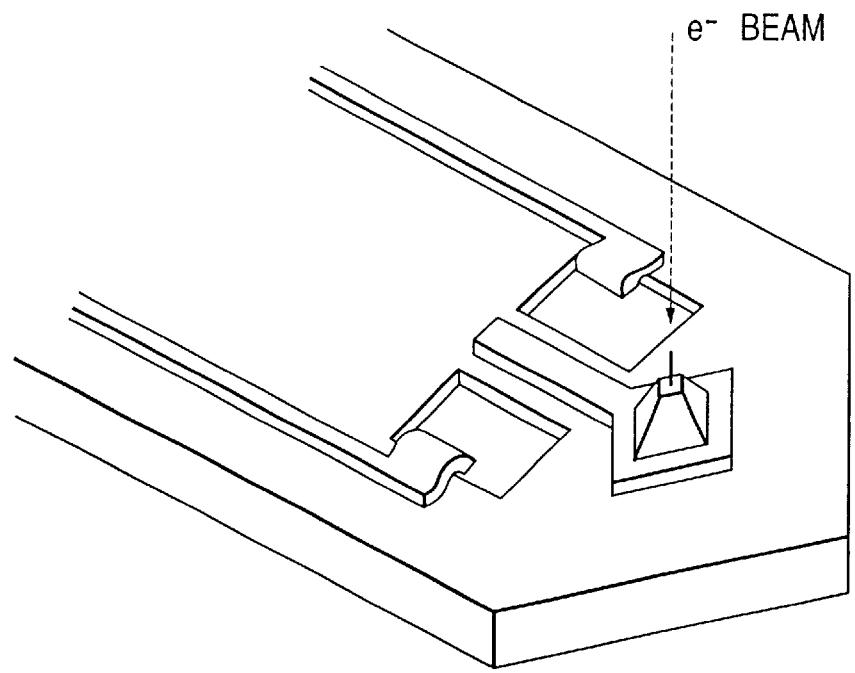
FIG. 12 is a schematic perspective view of the sensing needle of the second embodiment of the probe, showing how it is formed.
Figure 13:
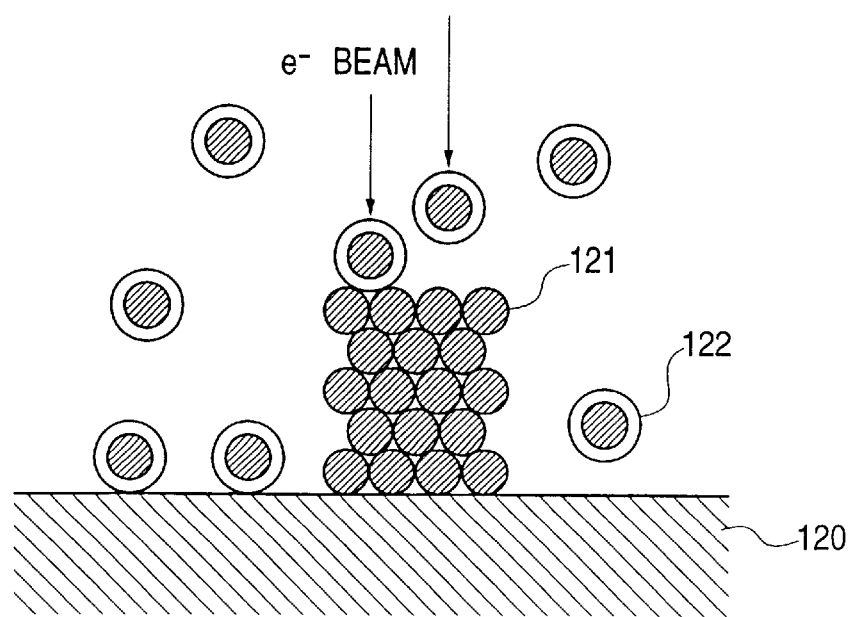
FIG. 13 is a schematic illustration of the principle of preparing the sensing needle of the second embodiment of the probe.

FIG. 12 is a schematic perspective view of the sensing needle of this example, showing how a pillar-shaped S/N is formed on an Au seat. The idea underlying this operation is described in Kam. L. Lee, David W. Abraham, F. Secord and L. Landstein, J. Vac. Sci. Technol. B9, 3562 (1991). Firstly, a cantilever main body carrying a seat is placed in a vacuum chamber and exposed to an organic metal complex gas. More specifically, dimethyl-gold trifluoroaxety lacetonate complex gas showing a pressure level between tens of several mTorr to 100 mTorr is used. Then, the seat is irradiated with an electron beam accelerated to tens of several keV to 100 keV at the center thereof. The electron beam is converged to an area having a diameter of tens of several number and an electric current of tens of several pA to 100 pA is used. A cylindrical Au pillar with a diameter of 0.2 μm and a height of 1 to 4 μm is produced when the duration of irradiation of the electron beam is between 100s and 300s. The cylindrical pillar has a conical front end. FIG. 13 shows how an Au pillar is formed on an Au seat 120. Molecules 122 of the organic Au complex (dimethyl-gold trifluoroaxety lacetonate complex) molecules 122 are adsorbed to the Au seat 120. Molecules 122 of the organic Au complex are decomposed to deposit Au atoms 121 in the area irradiated with the electron beam as a result of collisions of electrons. As a result, an Au pillar is allowed to grow.

A reproduction apparatus having a configuration as described above was prepared by using the above cantilever-type probe to find that it could reproduce highly densely recorded information at high speed with a bit detection sensitivity significantly improved from the conventional sensitivity level.

With either of the information reproduction probes prepared in Examples 1 and 2, since the field effect transistor is arranged very close to the electroconductive sensing needle and the sensing needle is held in contact with the gate electrode of the transistor, a binary signal corresponding to the recorded information can be output as a reproduction signal by modulating the gate voltage of the field effect transistor by way of potential change or dielectric polarization of the electroconductive sensing needle. Additionally, the wire connecting the sensing needle and the detection circuit can be made ideally short to minimize the stray capacitance therebetween so that the information densely recorded on the recording medium can be reproduced at high speed without reducing the bandwidth of the detection circuit.

If a method of bonding a metal thin film formed in a recess of a silicon single crystal substrate by way of a peeling layer on the metal bonding layer of an elastic body under pressure to transfer the profie of the recess is used, the step of forming a field effect transistor on the elastic body and that of forming a sensing needle are made independent relative to each other to broaden the freedom of designing the arrangement of placing the field effect transistor on the elastic body and that of forming the field effect transistor.

Additionally, the information reproduction probes prepared in Examples 1 and 2 can be used to reproduce information recorded on a recording medium as a local change of electric conductivity or information recorded on a recording medium in the form of a stored electric charge or as a result of polarizing the medium. Then, the densely recorded information can be reproduced at high speed.

Now, another mode of carrying out the invention will be discussed below. In both Examples 1 and 2, an electroconductive sensing needle is electrically connected to the gate electrode of a field effect transistor. Under this condition, the sensing needle is in a floating state and hence no voltage can be applied to the recording medium to record information thereon. In view of this inconvenience, a second transistor is formed on the cantilever so that a voltage may be applied to the electroconductive sensing needle in the mode of carrying out the invention as described below. Then, a probe having a second transistor formed on the cantilever can be used not only to reproduce information from a recording medium but also to record information on a recording medium by applying a recording voltage to the sensing needle.

With the above arrangement, if the second field effect transistor is OFF, the resistance between the drain and the source of the second field effect transistor is very high and hence the sensing needle is practically held to a floating state. Thus, an OFF state of the second field effect transistor corresponds to the above described embodiments adapted to reproduce information.

When reproducing a recording bit recorded on a recording medium as a local change in the electric conductivity, the presence or absence of a recording bit is converted into a difference in the electric potential of the electroconductive sensing needle and the channel between the drain and the source of the field effect transistor is turned ON/OFF or the channel resistance is modulated depending on the difference in the gate voltage of the transistor so as to output a binary signal corresponding to the recorded information. With this arrangement, the bit can be detected with a high degree of contrast if the total electric charge flowing into the sensing needle is reduced. Additionally, since the field effect transistor is arranged very close to the electroconductive sensing needle and the sensing needle is held in direct contact with the gate of the transistor, the wire connecting the sensing needle and the detection circuit is made ideally short to minimize the stray capacitance therebetween so that the information densely recorded on the recording medium can be reproduced at high speed without reducing the bandwidth of the detection circuit.

On the other hand, when information is recorded by storing locally an electric charge on a recording medium or by locally inverting the spontaneous polarization of the recording medium that is made of a ferroelectric thin film, the presence or absence of a recording bit, or the presence or absence of a stored electric charge or the difference in the orientation of polarization, is converted into a difference in the electric potential of the electroconductive sensing needle or a difference in the orientation of dielectric polarization in the electroconductive sensing needle and the channel between the drain and the source of the field effect transistor is turned ON/OFF or the channel resistance is modulated depending on the difference in the gate voltage of the transistor so as to output a binary signal corresponding to the recorded information. As a result, a simple detection system can be used if compared with an arrangement for detecting a change in the electrostatic capacitance or a displacement of the recording medium due to a piezoelectric effect. Additionally, according to the present invention, it is possible to reproduce information at high speed because no modulation is required. Still additionally, since the field effect transistor is arranged very close to the electroconductive sensing needle and the sensing needle is held in direct contact with the gate of the transistor, the wire connecting the sensing needle and the detection circuit is made ideally short to minimize the stray capacitance therebetween so that the information densely recorded on the recording medium can be reproduced at high speed without reducing the bandwidth of the detection circuit.

If the second field effect transistor is ON on the other hand, the resistance between the drain and the source of the second field effect transistor becomes very low so that the electroconductive sensing needle can be connected to an external circuit. Thus, an ON state of the second field effect transistor is adapted to record information. Therefore, a voltage can be applied to the second field effect transistor to record information by connecting the drain of the second field effect transistor to voltage application means. In either case, while a field effect transistor to be used for the purpose of signal detection takes an area of more than 1 $\mu m^2$ according to any known device forming process, the metal-made sensing needle is held in direct contact with the gate of the transistor so that the spatial resolution of the microscope is dominated by the profile of the tip of the sensing needle and a high spatial resolution of the order of nanometers is realized.

If a method of bonding a metal thin film formed in a recess of a silicon single crystal substrate by way of a peeling layer on the metal bonding layer of an elastic body under pressure to transfer the profile of the recess is used, the step of forming a field effect transistor on the elastic body and that of forming a sensing needle are made independent relative to each other to broaden the freedom of designing the arrangement of placing the field effect transistor on the elastic body and that of forming the field effect transistor.

Now, the above described mode of carrying out the present invention will be discussed by way of an example.

EXAMPLE 3

Figure 14:
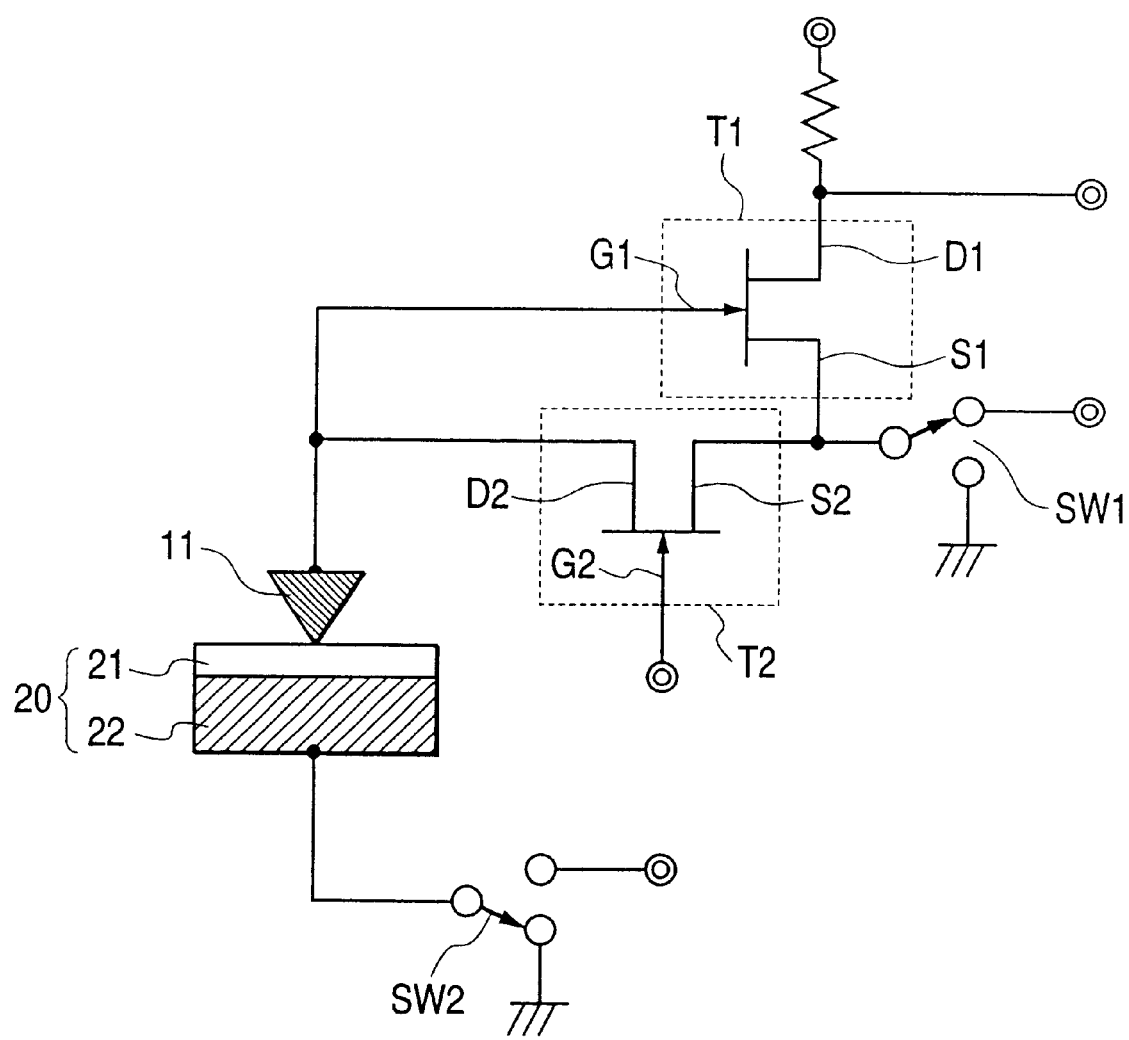
FIG. 14 is a schematic illustration of a probe according to the invention in a different mode of realization.

FIG. 14 is a schematic circuit diagram of the recording/reproduction probe of Example 3 that optimally shows the characteristics of this mode of carrying out the invention.

Referring to FIG. 14, recording medium 20 comprises an electroconductive substrate 22 and a recording layer 21 formed thereon and the electroconductive substrate 22 is connected to a switch mechanism SW2. A sensing needle electrode 11 is supported by an elastic body (not shown) and a pair of field effect transistors T1, T2 are arranged on the elastic body and near the sensing needle. The sensing needle is connected to the gate G1 of the field effect transistor T1 and, at the same time, to the drain D2 of the field effect transistor T2. The source S1 of the field effect transistor T1 is connected to the source S2 of the field effect transistor T2 and, at the same time, to another switch mechanism SW1.

For the operation of reproducing information, a control voltage is applied to the gate G2 to turn OFF the channel between the drain (D2) and the source (S2) of the field effect transistor T2 and hold the gate G1 of the transistor T1 and hence the sensing needle 11 in a floating state. Additionally, the sources S1, S2 are grounded by way of the switch mechanism SW1 and the electroconductive substrate 22 is connected to a bias voltage application means so that an information reproduction bias voltage may be applied to the electroconductive substrate 22. The potential of the sensing needle electrode is changed depending on the presence or absence of a recording bit recorded on the recording layer 21 and the channel between the drain (D1) and the source (S1) of T1 is turned ON/OFF or the channel resistance is modulated to output a binary signal that corresponds to the recorded information as a function of the change in the potential of the gate G1 of the field effect transistor T1.

For the operation of recording information, a control voltage is applied to the gate G2 to turn ON the channel between the drain (D2) and the source (S2) of the field effect transistor T2 and the electroconductive substrate is grounded by way of the switch mechanism SW2. Additionally, the sources S1 and S2 are connected to a recording voltage application means by way of the switch mechanism SW1 and a recording voltage is applied to the sensing needle 11 by way of the T2 to record information on the recording layer 21.

When information is recorded on the recording medium 20 as a local change in the electric conductivity, the electric potential of the sensing needle 11 changes as a function of the local difference of electric conductivity so long as a bias voltage is applied to the connection substrate 22 to change the electric potential of the gate G1 of the T1 to turn ON/OFF the channel between the drain (D1) and the source (S1) of the T1 or modulate the channel resistance so as to output a binary signal corresponding to the recorded information.

When, on the other hand, information is recorded by locally inverting the spontaneous polarization of the recording medium that is made of a ferroelectric thin film, the presence or absence of a recording bit, or the presence or absence of a stored electric charge or the difference in the orientation of polarization, is converted into a difference in the electric potential of the electroconductive sensing needle 11 or a difference in the orientation of dielectric polarization in the electroconductive sensing needle 11, which conversion the gate voltage in the vicinity of the threshold value $V_T$ is fluctuated by, and the channel between the drain and the source of the field effect transistor is turned ON/OFF or the channel resistance is modulated depending on the difference in the gate voltage of the transistor so as to output a binary signal corresponding to the recorded information.

The information reproduction bias voltage applied to the electrocoductive substrate 22 is so regulated that the electric potential of the sensing needle 11 moves to above or below the threshold level for turning ON/OFF the channel between the drain and the source of the T1 depending on the presence or absence of a recording bit. So long as such an arrangement is possible, any field effect transistor may be used for this mode of carrying out the invention regardless if the type of the transistor is the n-type or the p-type and if it is the enhancement type or the depletion type.

Figure 15:
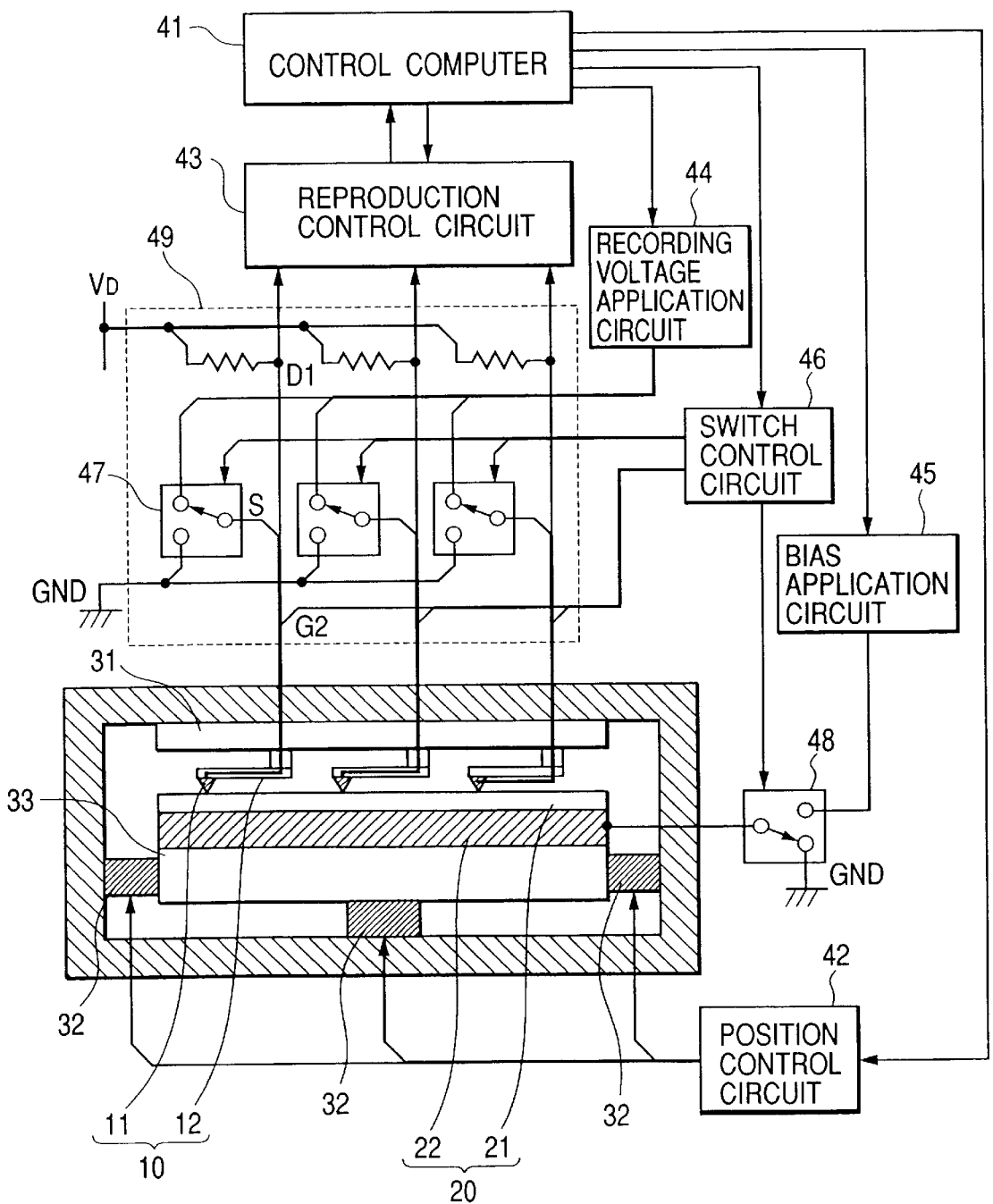
FIG. 15 is a schematic illustration of an information recording/reproduction apparatus comprising probes as shown in FIG. 14.

FIG. 15 is a schematic illustration of a recording/reproduction apparatus realized by using a recording/reproduction probe as shown in FIG. 14.

A plurality of probes 10 are arranged in such a way that their respective sensing needles 11 arranged at the front ends thereof contact a recording medium 20 comprising an electrocoductive substrate 21 and a recording layer 22. The sensing needle 11 of each of the probes 10 is supported by a cantilever 12 of an elastic body that is elastically deformed or deflected. The probes are supported by a common support 31 as integral parts thereof. If the elastic constant of the deflecting cantilever 12 is about 0.1[N/m] and its elastic deformation is about 1[μm], the contact force of the sensing needle relative to the recording medium will be about $10^{-7}$[N].

When operating a recording/reproduction apparatus having a configuration as described above, an xyz stage 33 fitted to the recording medium 20 is driven by an xyz drive mechanism 32 according to a position control signal from a position control circuit 42 that is held under control of a control computer 41 so that the probes 10 and the recording medium 20 are three-dimensionally moved relative to each other. The positions of the probes 10 are directionally regulated in the xy-direction and the z-direction so that tips of their sensing needles 11 contact the surface of the recording medium 20 at desired respective positions with desired respective levels of contact force.

When the probes 10 of a reproduction apparatus having a configuration as described above are driven to scan the recording medium 20, the tips of the sensing needles 11 of the respective probes 10 are constantly held in contact with the recording medium 20. With this contact scanning system of scanning the recording medium 20 by means of the sensing needles 11 whose tips are constantly held in contact with the recording medium 20, the undulations, if any, of the surface of the recording medium 20 are absorbed by elastic deformations of the cantilevers 12 so that the contact force between the tips of the sensing needles 11 and the surface of the recording medium 20 is substantially held to a constant level and hence the tips of the sensing needles 11 would not damage the surface of the recording medium 20. This system is simple because it does not require the use of piezoelectric elements for aligning individual probes in the z-direction and hence it is particularly adapted to an apparatus comprising a relatively large number of probes. Additionally, the probes 10 can be made to scan the recording medium 20 at high speed because they do not require a feedback control mechanism for controlling them in the z-direction relative to the recording medium 20.

Figure 3:
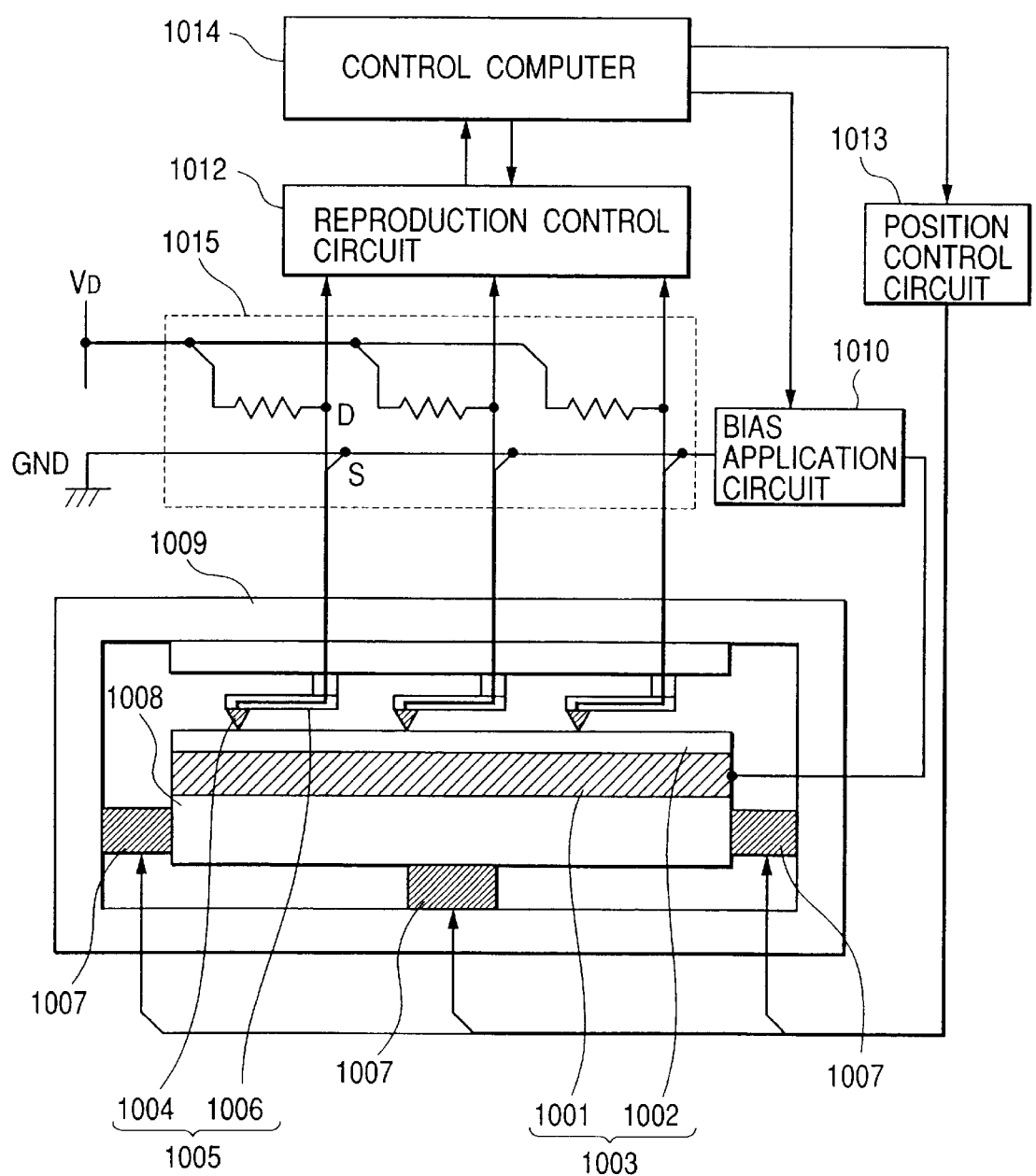
FIG. 3 is a schematic block diagram of an information reproduction apparatus comprising a probe according to the invention.

The recording layer 21 of the recording medium to be used with an apparatus as shown in FIG. 15 may be made of a material the same as that of the recording layer 1002 of FIG. 3 as described earlier.

The bit recorded on the recording medium is reproduced by the above apparatus in a manner as described below. A voltage is applied to the gate G2 of the transistor T2 of each of the probes 10 by means of a switch control circuit 46 to keep the channel between the drain and the source of the transistor T2 in an OFF state. Then, the switch mechanism (SW2) 48 is turned to the reproduction bias application side by means of the switch control circuit 46 to apply a bias voltage between the source (S:S1 and S2) of each of the probes and the recording medium 20 to modulate the gate voltage above or below a threshold level depending on the presence or absence of a recording bit. Additionally, the switch mechanism (SW1) 47 is turned to the grounding side by means of the switch control circuit 46. Then, voltage $V_D$ is applied to the drain D1 of each of the probes 10 by way of the resistor. The ON/OFF state of the channel between the drain and source of each of the probes 10 produced by the gate voltage modulated depending on the presence or absence of a recording bit is then converted into a voltage change, which is then output to the reproduction control circuit 43. The reproduction control circuit 43 forms a reproduction signal on the basis of the obtained voltage signals and outputs it to the control computer 41.

Information is recorded on the recording medium by means of the above recording/reproduction apparatus in a manner as described below. A voltage is applied to the gate G2 of the transistor T2 of each of the probes 10 by means of a switch control circuit 46 to keep the channel between the drain and the source of the transistor T2 in an ON state. Then, the switch mechanism (SW2) 48 is turned to the grounding side by means of the switch control circuit 46. Then, the switch mechanism (SW1) 47 is turned to the recording voltage application side by means of the switch control circuit 46. The recording voltage application circuit 44 applies a recording voltage between the source (S1 and S2) of each of the probes and the recording medium 20 produces a recording bit according to the output signal of the control computer 41.

Note that the switch mechanisms 47, 48 may be integrally prepared in the form of so may FET switches on the support 31 with the probes. Additionally, the wires leading to the probes including the drain resistors (49 in FIG. 15), the switch control circuit, the bias voltage application circuit, the recording voltage application circuit and the voltage application circuit may also be integrally formed on the support 31. While the above described recording/reproduction circuit comprises a plurality of probes, it may alternatively be made to comprise a single probe.

Figure 16A:
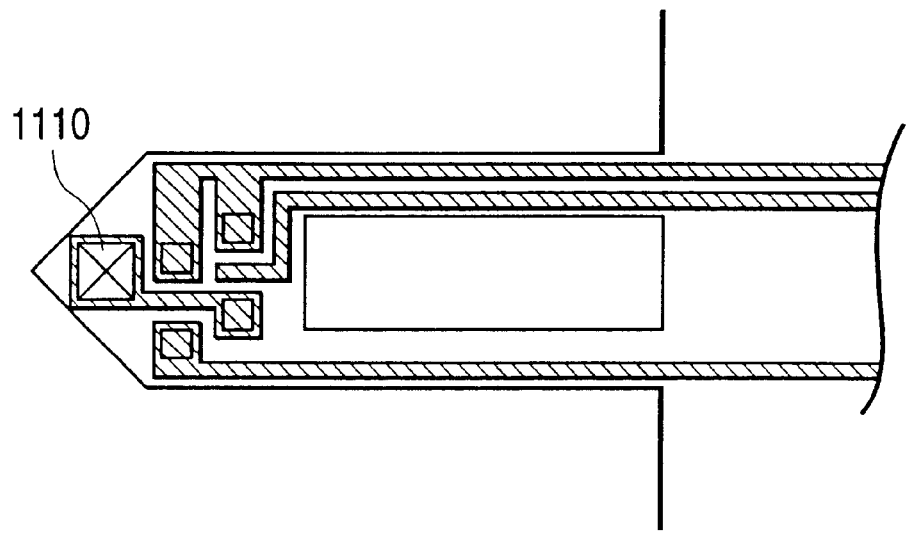
FIGS. 16A and 16B are a schematic plan view and a schematic lateral cross sectional view of a third embodiment of a probe according to the invention.
Figure 16B:
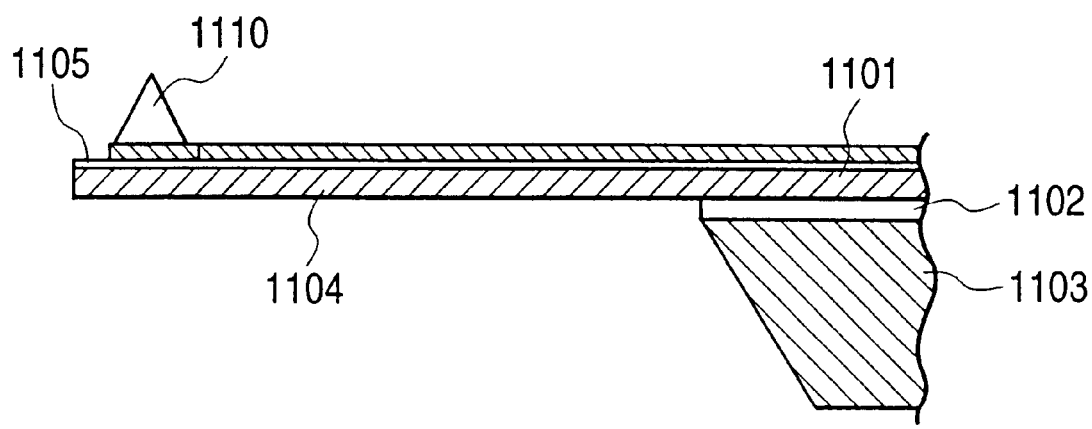

FIGS. 16A and 16B schematically illustrate the entire profile of the cantilever type recording/reproduction probes of Example 3. FIG. 16A is a schematic plan view and FIG. 16B is a schematic lateral cross sectional view.

Referring to FIGS. 16A and 16B, there are shown a 5 μm thick p-type Si single crystal thin film (plane bearing of plane (100)) 1101, a 1 μm thick $SiO_2$ thin film 1102 and a 0.5 mm thick Si single crystal substrate 1103 with a plane bearing of plane (100). The p-type Si single crystal thin film 1101 is partly projecting from the Si substrate 1103 to operate as cantilever main body 1104. The upper surface of the cantilever main body 1104 is covered by an $SiO_2$ thin film 1105. Dimensions of a length of L=800 μm, a width of W=200 μm and a height of d=5 μm were selected for the cantilever main body 1104. As a result, a cantilever showing an elastic constant of about 1.7[N/m] for deflection was obtained.

Figure 17:
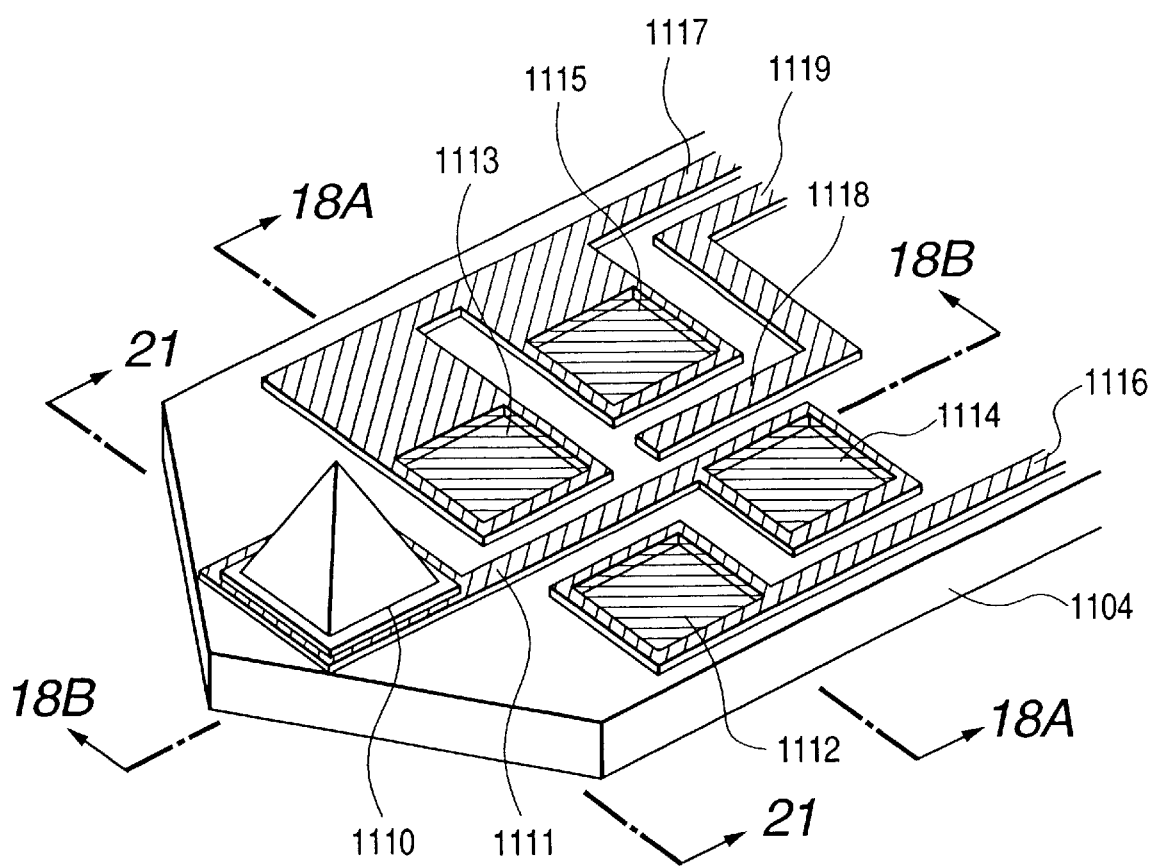
FIG. 17 is a schematic perspective view of the tip of the third embodiment of the probe according to the invention.
Figure 18A:
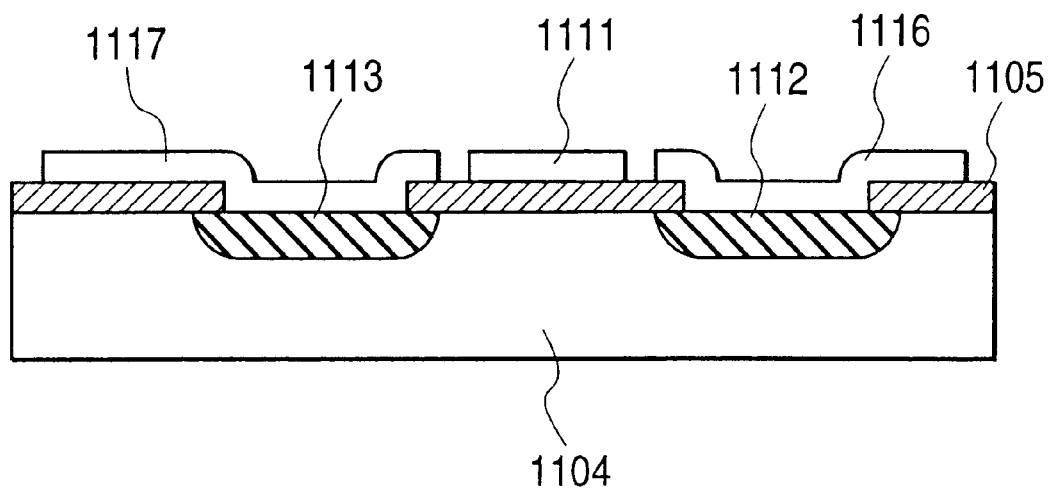
FIGS. 18A and 18B are schematic cross sectional views of the third embodiment of the probe taken along lines 18A—18A and 18B—18B in FIG. 17, respectively.
Figure 18B:
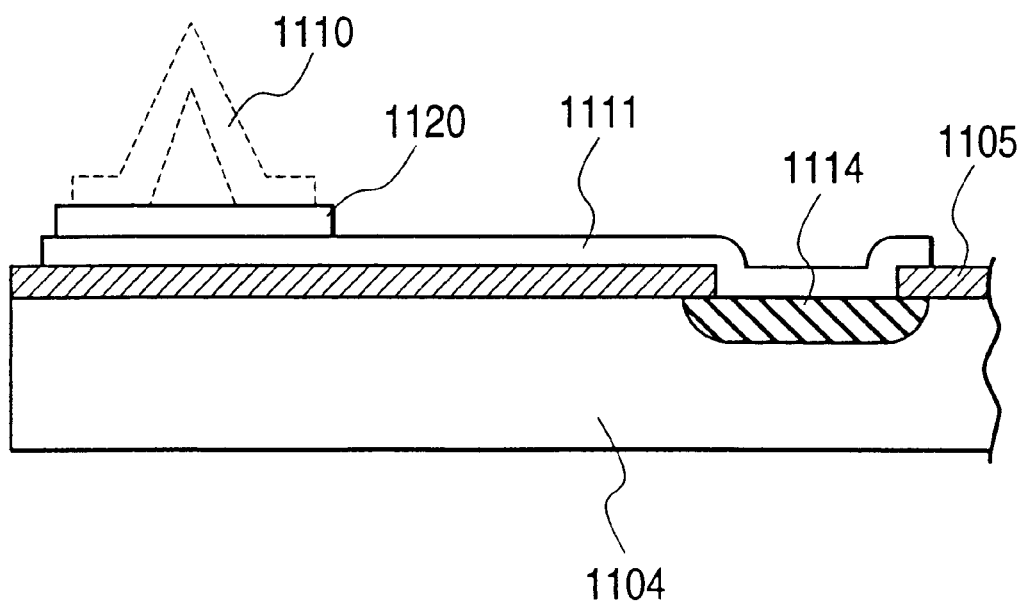

FIG. 17 is a schematic perspective view of the front end of the cantilever. FIG. 18A is a cross sectional view taken along line 18A—18A in FIG. 17 and FIG. 18B is a cross sectional view taken along line 18B—18B in FIG. 17. A pyramid-shaped sensing needle 1110 and an electrode 1111 connected to the sensing needle 1110 are arranged on the front end of the cantilever main body 1104. The gate electrode 1111 is provided at the opposite lateral sides thereof with respective windows formed by removing the SiO$_2$ thin film and n-type Si regions 1112, 1113 are respectively formed in the windows. Aluminum (Al) electrodes 1116, 1117 are fitted respectively to the n-type Si regions 1112, 1113. Additionally, another pair of windows are formed by removing the SiO$_2$ thin film 1105 and n-type Si regions 1114, 1115 are respectively formed in the windows. The Al electrode 1117 is also fitted to the n-type Si region 1115 and the electrode fitted to the n-type Si region 1114 is connected to the electrode 1111. Thus, a field effect transistor (FET) is formed at and near the front end of the cantilever main body 1104, where the n-type Si regions 1112, 1114 operate as drain and the n-type Si regions 1113, 1115 operate as source, while the electrode 1111 formed on the SiO$_2$ thin film 1105 between the n-type Si regions 1112, 1113 operates as gate for them. The electrode 1111 is further connected to the sensing needle 1110. An Al electrode 1118 is fitted onto the SiO$_2$ thin film 1105 between the n-type Si regions 1114, 1115 and connected to an Al leading out electrode 1119.

Now, the method of preparing the cantilever used in this example will be described by referring to FIGS. 19A through 19G. Firstly, an SOI (silicon on insulator) substrate formed by sequentially laying a 0.5 mm thick Si crystal substrate 1103 with a plane bearing of plane (100), a 1 µm thick SiO$_2$ thin film 1102 operating as insulation layer and a 5 µm thick Si single crystal thin film 1101 is prepared. In this example, the Si single crystal thin film 1101 is a p-type Si single crystal thin film doped with boron (B) atoms as impurity. Note that the cross sectional views of FIG. 19A through 19G are taken along line 18A—18A in FIG. 17.

Figure 19A:
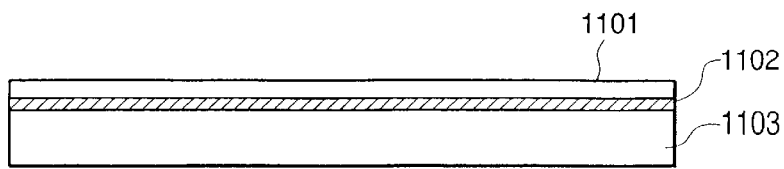
FIGS. 19A, 19B, 19C, 19D, 19E, 19F and 19G are schematic cross sectional views of the cantilever of the third embodiment, showing different manufacturing steps.
Figure 19B:
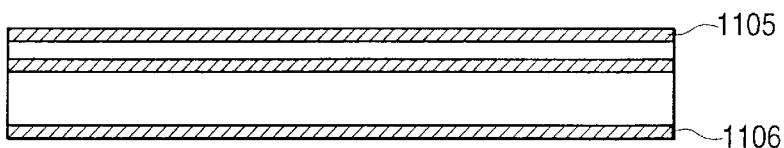
Figure 19C:
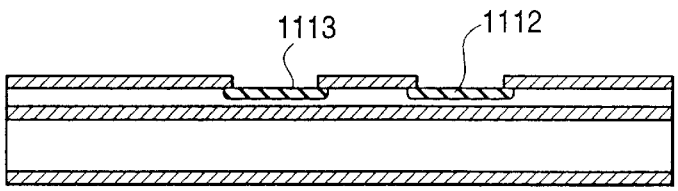

Firstly, as shown in FIG. 19B, SiO$_2$ thin films 1105, 1106 are formed on the upper and lower surfaces of the SOI substrate by thermal oxidation. Then, as shown in FIG. 19C, window areas are formed in the SiO$_2$ thin film 1105 by means of photolithography and etching and phosphor (P) atoms are introduced as impurity by means of ion implantation. P atoms are accelerated by 50 to 100 keV and the windows are exposed to a dose (the number of ion atoms implanted by 1 cm$^2$ of the surface of the semiconductor) of about 10$^{13}$ cm$^{-2}$. Then, the windows are heat treated (at 600 to 700° C. for 30 minutes) to heal the damage to the crystal lattice. As a result, n-type Si regions 1112, 1113 are produced.

Figure 19D:
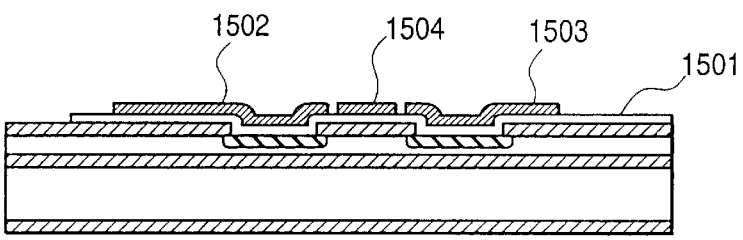

Then, aluminum is deposited on the SiO$_2$ thin film 1105 and the n-type Si regions 1112, 1113 by evaporation to produce an Al thin film 1501. Then, a resist layer is formed and patterned by photolithography to produce resist patterns 1502, 1503, and 1504 that correspond to respective electrode patterns as shown in FIG. 19D.

Figure 19E:
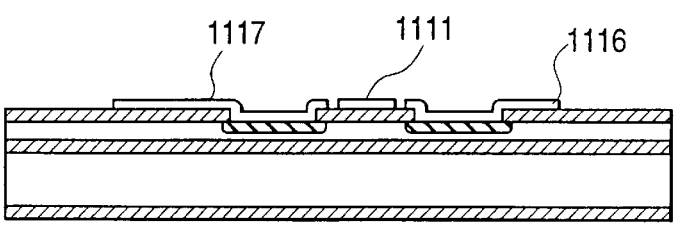

Then, the area of the aluminum thin film 1501 not covered by the resist layer is etched out and then the resist patterns 1502, 1503, 1504 are removed. Thus, aluminum electrodes 1111, 1116, and 1117 as shown in FIG. 19E are produced. With the above steps, the n-type Si regions 1114, 1115, the Al electrodes covering them, the gate electrode 1118 and the leading out electrode 1119 are formed at the same time.

Figure 19F:
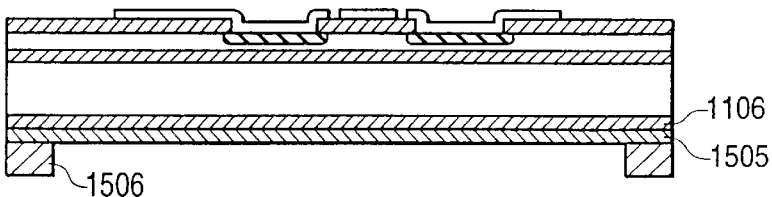
Figure 19G:
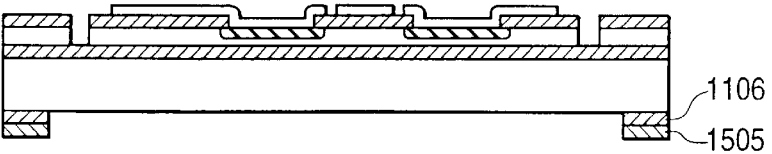

Subsequently, as shown in FIG. 19F, a 0.5 µm thick silicon nitride film 1505 is formed on the rear surface of the Si substrate 1103. Thereafter, a resist layer 1506 is formed as pattern for the cantilever main body by photolithography and the Si single crystal thin film 1101 is etched to form a pattern corresponding to the profile of the cantilever by dry-etching. Then, as shown in FIG. 19G, the silicon nitride film 1505 and the SiO$_2$ thin film 1105 on the rear surface are also etched to form a pattern to be used as etching mask.

FIGS. 20A through 20E schematically illustrate steps of forming a sensing needle to be fitted to the cantilever of this example.

Figure 20A:
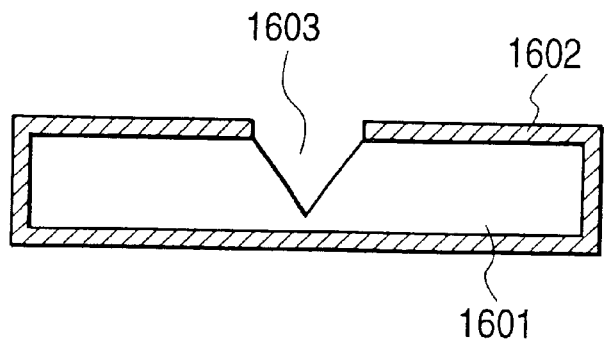
FIGS. 20A, 20B, 20C, 20D and 20E are schematic cross sectional views of the sensing needle of the third embodiment of the probe, showing different manufacturing steps.

Firstly, as shown in FIG. 20A, a thermal oxide film was formed as protection layer 1602 on an Si single crystal substrate 1601 with a plane bearing of plane (100). Then, the protection layer 1602 was removed in a desired area thereof by a patterning operation using photolithography and etching to expose a 6 µm square area of the silicon substrate. Then, the silicon of the patterned area was etched out by means of etching that is anisotropic relative to the crystallographic axis, using an aqueous solution of potassium hydroxide. More specifically, a 30% aqueous solution of potassium hydroxide was used with solution temperature of 90° C. and the duration of the etching operation was 15 minutes. As a result, an inverted-pyramid-shaped recess 1603 surrounded by four planes, each being equivalent to plane (111), and having a depth of about 4 µm was produced.

Figure 20B:
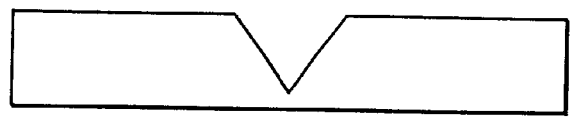
Figure 20C:
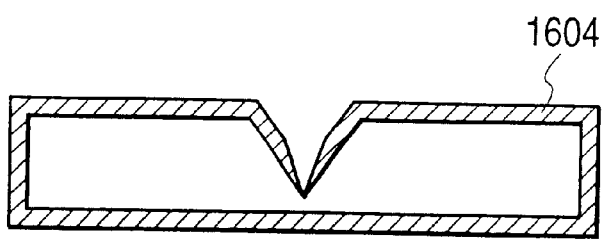

Then, as shown in FIG. 20B, the thermal oxide film of the protection layer 1602 was removed by means of an aqueous solution of a mixture of hydrofluoric acid and ammonium fluoride (HF:NH$_4$F=1:5). Thereafter, the substrate 1601 was washed with a mixture solution of sulfuric acid and hydrogen peroxide heated to 120° C. and a 2% aqueous solution of hydrofluoric acid. Then, the substrate 1601 was heated in an atmosphere of oxygen and hydrogen to 1,000° C. in an oxidizing furnace to deposit silicon dioxide by 400 nm for a peeling layer 1604 as shown in FIG. 20C.

Figure 20D:
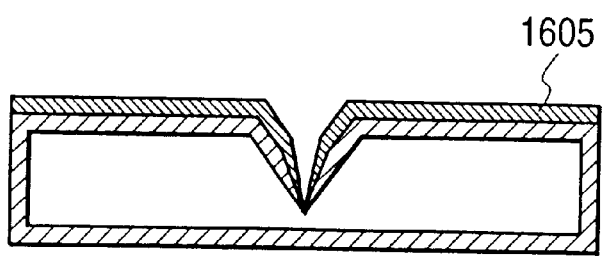
Figure 20E:
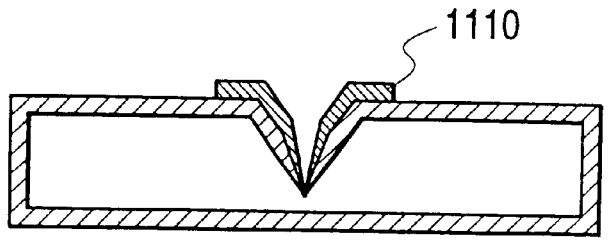

Subsequently, a sensing needle 1110 was formed there. Firstly, as shown in FIG. 20D, a gold Au film was formed to a thickness of 300 nm by vacuum evaporation for the sensing needle 1110. Then, the material 1605 of the sensing needle 1110 is patterned by photolithography and etching to actually produce a sensing needle 1110 as shown in FIG. 20E.

Figure 21A:
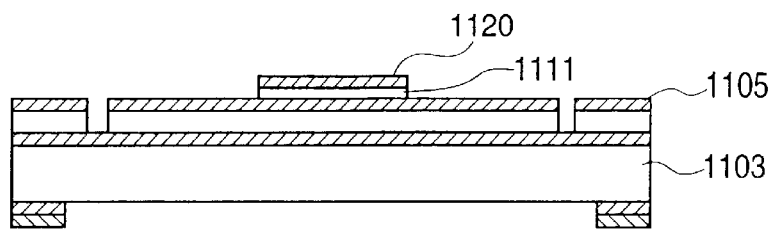
FIGS. 21A, 21B, 21C, 21D, 21E and 21F are schematic cross sectional views of the third embodiment of the probe, showing different steps of bonding the sensing needle onto the cantilever.
Figure 21B:
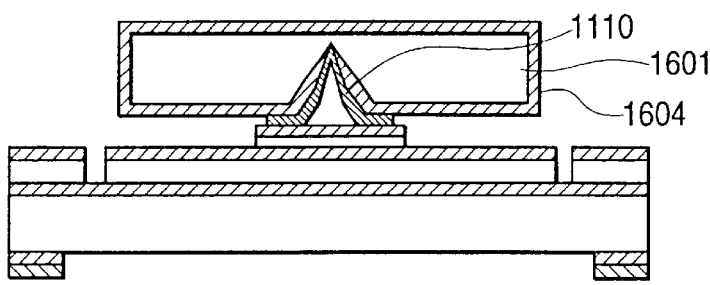
Figure 21C:
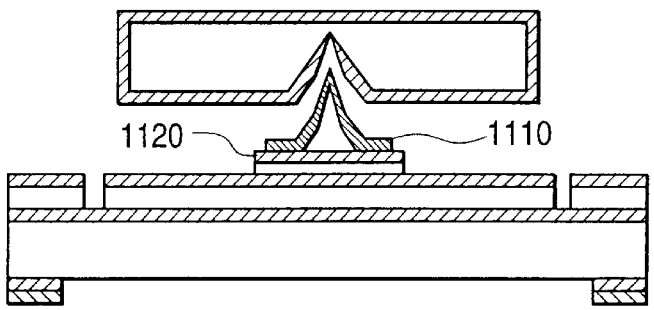

FIGS. 21A through 21F schematic illustrate steps of bonding the sensing needle 1110 onto the cantilever main body 1104 under pressure and producing a finished cantilever. Note that the cross sectional views of FIGS. 21A through 21F are taken along line 21—21 intersecting the sensing needle in FIG. 17. Firstly, as shown in FIG. 21A, a titanium Ti film and a gold Au film are formed to respective thicknesses of 3 nm and 50 nm and then patterned by means of photolithography and etching to produce a bonding layer 1120. Then, as shown in FIG. 21B, the sensing needle 1110 was aligned with the bonding layer 1120 on the cantilever, placed vis-a-vis and held in contact with the latter. Then, the sensing needle 1110 was bonded to the bonding layer 1120 by applying a load on them. Then, as shown in FIG. 21C, the two substrates (103, 601) were pulled away from each other to separate the peeling layer 1604 and the sensing needle 1110 along the interface thereof.

Figure 21D:
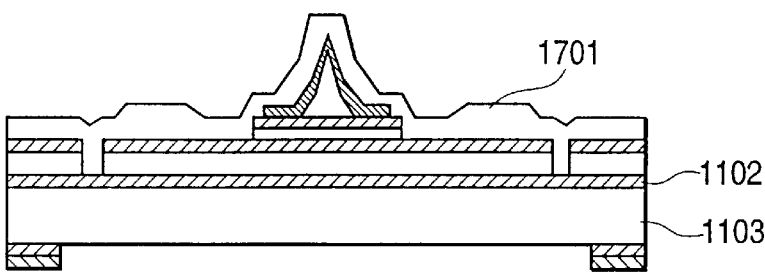
Figure 21E:
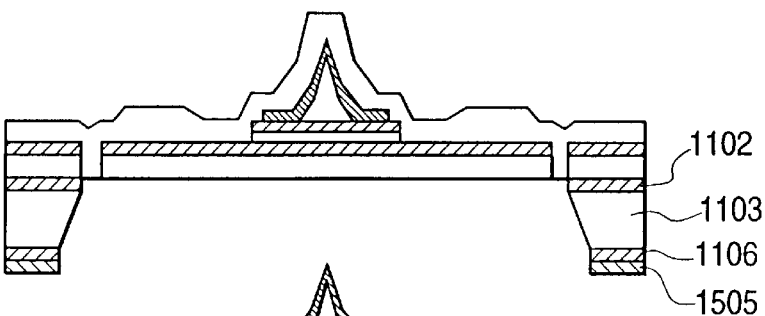
Figure 21F:
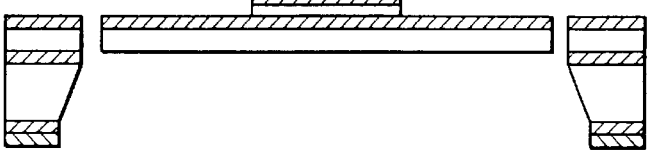

Subsequently, as shown in FIG. 21D, a polyimide layer was formed on the entire surface by applying polyimide by means of a spin coating technique and baked to produce a surface protection layer 1701. Then, as shown in FIG. 21E, the substrate 1103 was etched from the rear surface by means of a 30% aqueous solution of potassium hydroxide heated to 90° C., using the silicon nitride layer 1505 on the rear surface as an etching mask. Thereafter, the SiO$_2$ thin film 1102 was removed by means of an aqueous solution of a mixture of hydrofluoric acid and ammonium fluoride.

Finally, as shown in 21F, a cantilever type probe was prepared by removing the surface protection layer 1701 by means of oxygen plasma.

A reproduction apparatus having a configuration as described above was prepared by using the above cantilever type probe to find that it could form a fine bit pattern by applying a voltage. Additionally, it could reproduce highly densely recorded information at high speed with a bit detection sensitivity significantly improved from the conventional sensitivity level.

As described above, with the recording/reproduction probe of Example 3, where a field effect transistor is formed at and near the pole of the sensing needle arranged on an elastic body supporting the electroconductive sensing needle and the sensing needle is connected to the gate of the field effect transistor, the gate voltage of the field effect transistor is modulated as a function of the change in the electric potential of the sensing needle in order to output a binary signal according to the recorded information.

Additionally, since another field effect transistor is arranged apart from the above field effect transistor having its gate electrode connected to the sensing needle, a recording voltage can be applied to the electroconductive sensing needle by way of the second field effect transistor and hence the same sensing needle can be shared by the two field effect transistors to apply a voltage. Then, a fine recording bit can be formed on the recording medium by applying a voltage to the sensing needle.

As described above, with a recording/reproduction probe having a configuration as described above by referring to Example 3, information can be recorded on a recording medium by applying a voltage by way of the sensing needle. In other words, it is possible to record information by utilizing a local change in the electric conductivity, storage of an electric charge in the recording medium or inversion of polarization of the recording medium.

Additionally, it is possible to use the same recording/reproduction probe in order to reproduce information recorded by utilizing a local change in the electric conductivity, storage of an electric charge in the recording medium or inversion of polarization of the recording medium so that information densely recorded on a recording medium can be reproduced at high speed.

Furthermore, if a method of bonding a metal thin film formed in a recess of a silicon single crystal substrate by way of a peeling layer on the metal bonding layer of an elastic body under pressure to transfer the profile of the recess is used, the step of forming a field effect transistor on the elastic body and that of forming a sensing needle are made independent relative to each other to broaden the freedom of designing the arrangement of placing the field effect transistor on the elastic body and that of forming the field effect transistor.

What is claimed is:

1. A probe comprising:
   a cantilever having a movable end and formed from an elastic body;
   an electroconductive sensing needle arranged at the movable end of said cantilever; and
   a first field effect transistor arranged at the movable end of said cantilever and having a gate electrode electrically connected to said electroconductive sensing needle.

2. A probe according to claim 1, wherein
   said cantilever is formed from a substrate having a semiconductor layer at least on the surface thereof.

3. A probe according to claim 2, wherein
   said semiconductor layer is of one conduction type, said first field effect transistor has a source region and a drain region formed on part of said semiconductor layer and is of another conduction type, and said probe further comprises a gate electrode formed on said semiconductor layer with a gate insulation layer interposed therebetween.

4. A probe according to claim 2, wherein
   said substrate is an SOI substrate formed by laying a single crystal silicon thin film on an insulation layer.

5. A probe according to claim 1, further comprising a second field effect transistor formed on said cantilever and having its drain electrically connected to said electroconductive sensing needle.

6. An information recording/reproduction apparatus adapted to record information on a recording medium by causing a probe according to claim 5 to scan the recording medium while holding said probe in contact with the recording medium and applying a voltage between the recording medium and the electroconductive sensing needle by way of said second field effect transistor or reproduce information from a recording medium storing recorded information by causing the probe to scan the recording medium while holding it in contact with the recording medium and detecting the electric current flowing through said first field effect transistor.

7. An information reproduction apparatus adapted to reproduce information from a recording medium storing recorded information by causing a probe according to any of claims 1 through 5 to scan the recording medium while holding said probe in contact with the recording medium and detecting the electric current flowing through said first field effect transistor.

8. A method of manufacturing a probe comprising steps of:
   preparing a substrate at least having a semiconductor layer on its surface;
   forming a field effect transistor having a gate electrode in the semiconductor layer;
   forming an electroconductive sensing needle on the gate electrode; and
   processing the substrate to produce a movable end out of the portion thereof where the field effect transistor is formed.

9. A method of manufacturing a probe according to claim 8, wherein
   the semiconductor layer has one conductive type, said step of forming a field effect transistor includes a step of forming a source region and a drain region having another conduction type by introducing an impurity into part of said semiconductor layer, and said method further comprises the steps of forming a gate insulation layer on the semiconductor layer and forming a gate electrode on the gate insulation layer.

10. A method of manufacturing a probe according to claim 8 or 9, wherein
    said step of forming an electroconductive sensing needle includes a step of preparing another substrate having a recess on its surface, a step of forming an electroconductive material layer on the surface of the substrate including the recess, a step of forming an electroconductive sensing needle by patterning the electrocon ductive material layer and a step of transferring the electroconductive sensing needle formed on the substrate having the recess onto the gate electrode of the substrate having the semiconductor layer.

11. A method of manufacturing a probe according to claim 8 or 9, wherein said step of forming an electroconductive sensing needle includes a step of arranging the substrate carrying the field effect transistor formed thereon in an atmosphere of an organic metal complex and causing a metal pillar to grow by irradiating the gate electrode with an electron beam.

12. A method of manufacturing a probe according to claim 8 or 9, wherein the substrate having the semiconductor layer is an SOI substrate formed by laying a single crystal silicon thin film on an insulation layer.

13. A method of manufacturing a probe according to claim 8, further comprising a step of forming another field effect transistor having its drain electrically connected to the electroconductive sensing needle on the cantilever.

* * * * *

UNITED STATES PATENT AND TRADEMARK OFFICE
CERTIFICATE OF CORRECTION

PATENT NO.   : 6,477,132 B1
DATED        : November 5, 2002
INVENTOR(S)  : Hiroo Azuma et al.

It is certified that error appears in the above-identified patent and that said Letters Patent is hereby corrected as shown below:

Column 2,
Line 29, "hole with" should read -- hole with a --;
Line 39, "electrodoncutivity" should read -- electroconductivity --; and
Line 49, "know" should read -- known --.

Column 4,
Lines 22 and 24, "of" should read -- of the --.

Column 6,
Line 18, "profie" should read -- profile --.

Column 8,
Line 32, "this" should read -- these --.

Column 11,
Line 16, "Firstly" should read -- Firstly, --; and
Line 47, "schematic" should read -- schematically --.

Column 12,
Line 48, "Firstly" should read -- Firstly, --.

Column 14,
Line 21, "profie" should read -- profile --.

Column 20,
Line 40, "schematic" should read -- schematically --.

UNITED STATES PATENT AND TRADEMARK OFFICE
CERTIFICATE OF CORRECTION

PATENT NO. : 6,477,132 B1
DATED : November 5, 2002
INVENTOR(S) : Hiroo Azuma et al.

It is certified that error appears in the above-identified patent and that said Letters Patent is hereby corrected as shown below:

Column 22,
Line 67, "electrocon" should read -- electrocon- --.

Signed and Sealed this

Fourth Day of November, 2003

JAMES E. ROGAN
*Director of the United States Patent and Trademark Office*